US012511772B2

(12) United States Patent
Brak et al.

(10) Patent No.: US 12,511,772 B2
(45) Date of Patent: Dec. 30, 2025

(54) SYSTEM AND METHOD FOR MEASURING A BULB DIAMETER OF AN INSTALLED ONE-SIDED FASTENER IN A STRUCTURE

(71) Applicant: The Boeing Company, Arlington, VA (US)

(72) Inventors: Martin Brak, Hamburg (DE); Nicholas Chin Reasoner, Lake Forest Park, WA (US); Andrei Draghici, Hamburg (DE); Philipp Färber, Hamburg (DE); Sven Rasche, Hamburg (DE)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/656,552

(22) Filed: May 6, 2024

(65) Prior Publication Data
US 2025/0342607 A1  Nov. 6, 2025

(51) Int. Cl.
G06T 7/13         (2017.01)
G01B 11/08        (2006.01)
G06T 7/62         (2017.01)
G06T 7/90         (2017.01)
H04N 23/50        (2023.01)

(52) U.S. Cl.
CPC .............. G06T 7/62 (2017.01); G01B 11/08 (2013.01); G06T 7/13 (2017.01); G06T 7/90 (2017.01); H04N 23/555 (2023.01); G06T 2207/10024 (2013.01); G06T 2207/10068 (2013.01); G06T 2207/30164 (2013.01)

(58) Field of Classification Search
CPC .... G06T 7/62; G06T 7/13; G06T 7/90; G06T 2207/10024; G06T 2207/10068; G06T 2207/30164; G01B 11/08; H04N 23/555
See application file for complete search history.

(56) References Cited

U.S. PATENT DOCUMENTS

2021/0132572 A1*  5/2021  Sutherland .......... B25B 27/0014
2022/0138928 A1*  5/2022  Brockway .......... G01N 21/9515
                                                              382/141
2023/0279893 A1*  9/2023  Ahn .................... F16B 29/00
                                                              411/8
2024/0185413 A1*  6/2024  Sisco .................... G01B 11/24
2024/0295508 A1*  9/2024  Reasoner ............. G01N 23/046

* cited by examiner

Primary Examiner — Howard D Brown, Jr.

(57) ABSTRACT

There is provided a system for measuring a bulb diameter of an installed one-sided fastener in a structure. The system includes the structure and the installed one-sided fastener installed through a hole in the structure. The installed one-sided fastener has a fastener body having a fastener bulb with the bulb diameter. The system includes an optical imaging system having a probe, a camera sensor, and a linear axis slide. The system includes image data, including a first image of the fastener bulb taken from a first position, and a second image of the fastener bulb taken from a second position positioned a predetermined distance from the first position. The system includes a post image processing system, to process the image data, and to determine a bulb diameter measurement of the bulb diameter, and includes an edge detection process, an ellipse fitting process, and a stereo vision process.

20 Claims, 13 Drawing Sheets

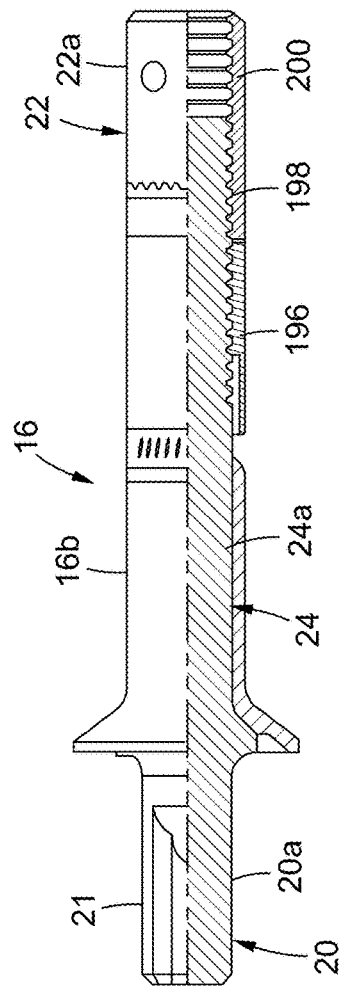
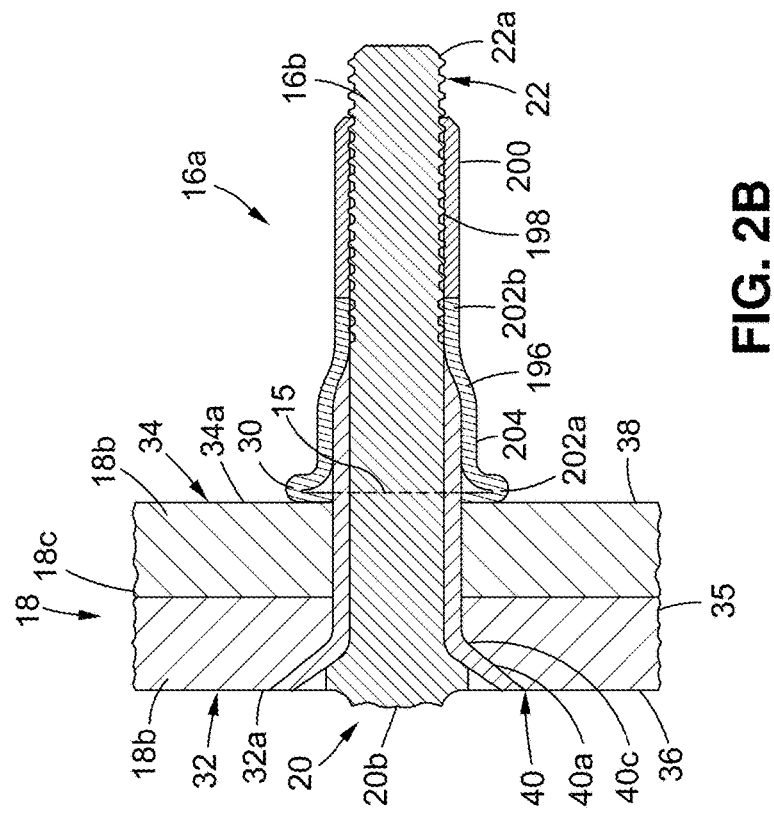

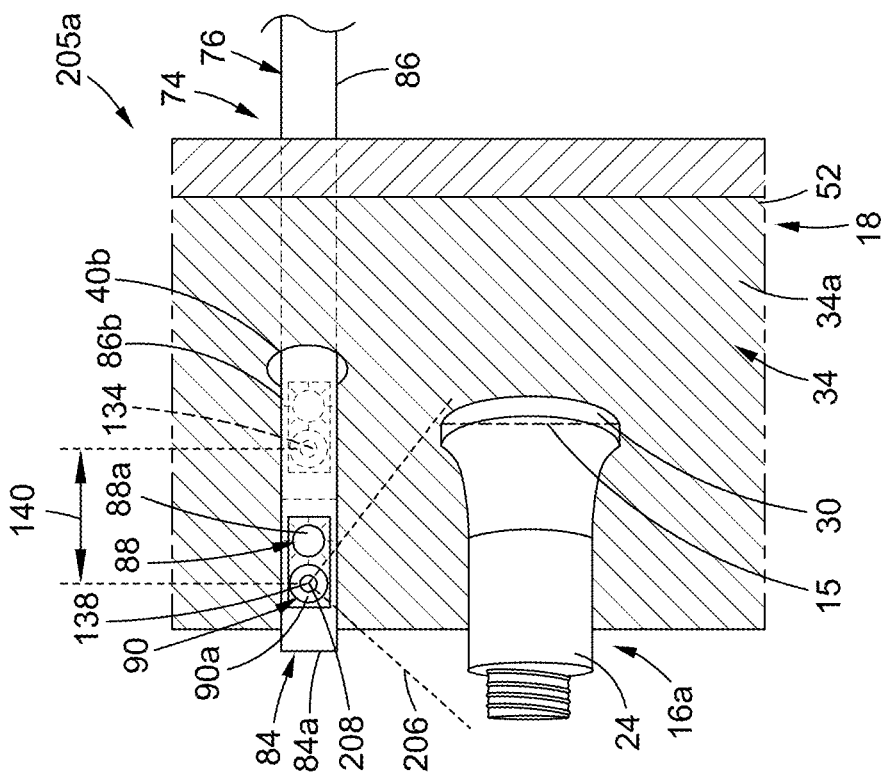
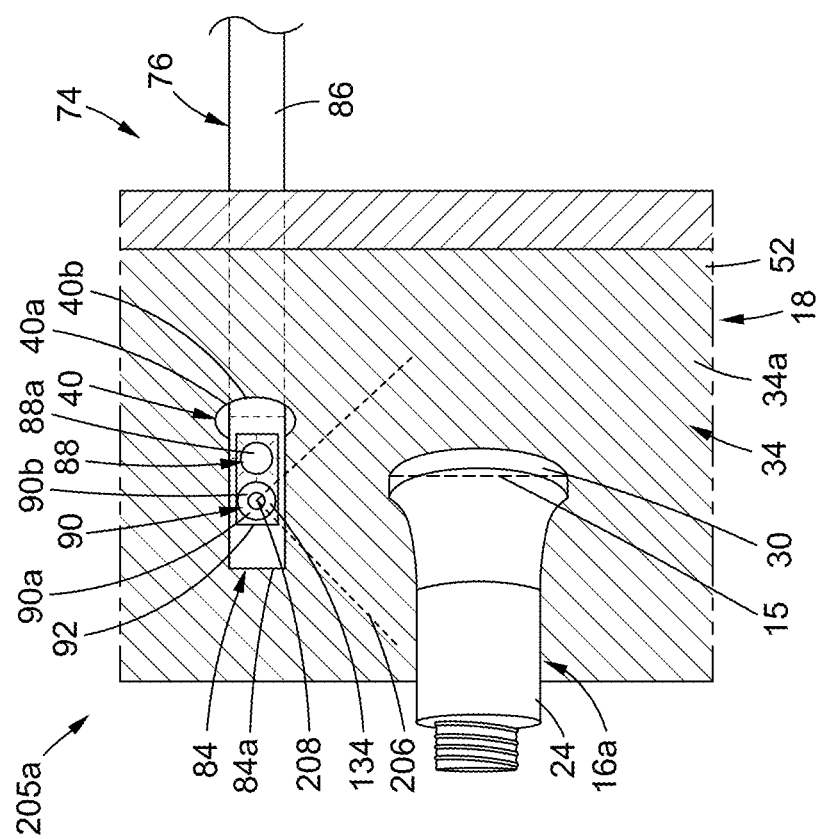

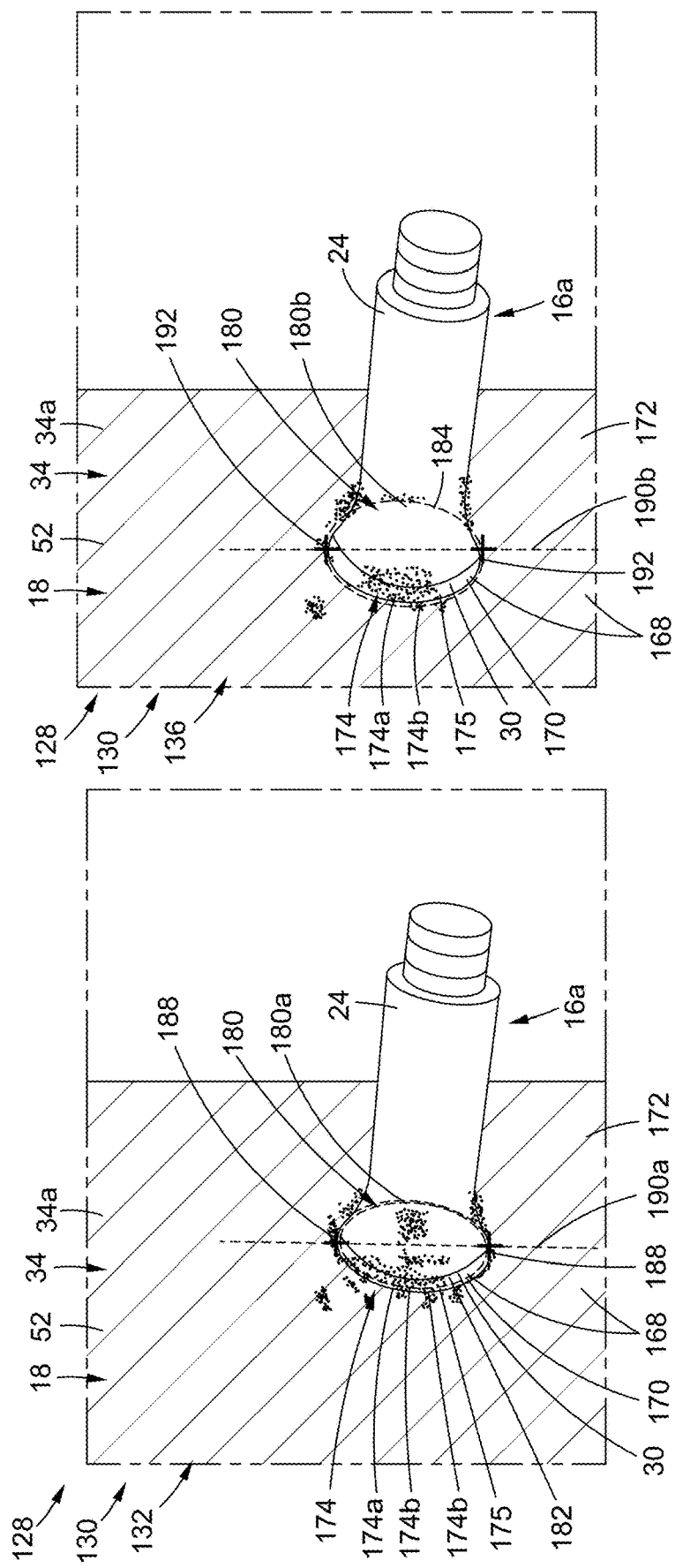

SYSTEM AND METHOD FOR MEASURING A BULB DIAMETER OF AN INSTALLED ONE-SIDED FASTENER IN A STRUCTURE

FIELD

The present disclosure relates generally to measuring fasteners, and more particularly, to systems and methods for measuring a bulb diameter of installed one-sided fasteners in a structure.

BACKGROUND

One-sided fasteners, also referred to as "blind fasteners", are mechanical fasteners used to typically join two or more structural members together, where the one-sided fastener is only readily accessible at an exterior end on an exterior side of the joined structural members, and is not readily accessible at an interior end protruding from an interior side of the joined structural members, and the interior end is not visible, or is "blind". One-sided fasteners may be used in the manufacture of aircraft, spacecraft, rotorcraft, watercraft, automobiles, trains, architectural structures, and other vehicles or structures. The one-sided fasteners may be installed in confined spaces, for example, in an aircraft fuel tank.

One method used to inspect the installation of one-sided fasteners, or blind fasteners, includes a mechanic or an inspector visually inspecting the installation of the one-sided fastener, such as with a borescope or another optical instrument, inserted into a fastener hole adjacent to the installed one-sided fastener, to assist the visual inspection of difficult to access cavities or areas, and to visually detect if there are any inconsistencies, for example, in the formation of a fastener bulb of the one-sided fastener. However, such known method only verifies that the fastener bulb has actually formed and does not measure a bulb diameter of the fastener bulb to verify proper installation of the one-sided fastener, and such known method does not verify if the bulb diameter is acceptable or not based on a predetermined minimum fastener bulb diameter. Thus, an installed one-sided fastener may be accepted or rejected without any type of fastener bulb diameter measurement.

Known inspection systems and methods typically cannot measure the fastener bulb diameter of installed one-sided fasteners without entering a confined space and measuring the installed one-sided fasteners from the back side of a structure. One known system and method used to measure and inspect the installation of one-sided fasteners, or blind fasteners, includes a mechanic or inspector physically entering a confined space to manually measure a bulb diameter with a "go/no go" gauge by moving it across the fastener bulb to verify if it meets the predetermined minimum fastener bulb diameter and to verify proper installation of the one-sided fastener. However, such confined space entry may be time consuming and labor intensive, and may create ergonomic issues. Such increased time and labor may, in turn, result in increased costs of manufacturing and inspecting structures with the one-sided fasteners.

In addition, a known automated method to inspect the installation of one-sided fasteners exists. Such known method includes using a camera based system and a process calculation requiring a known distance from the installed one-sided fastener to a camera sensor and counting pixels. However, such known automated method only verifies that the fastener bulb has formed, and can only measure the bulb diameter of the fastener bulb through calibration and known distances to the fastener, to verify if the bulb diameter is acceptable or not based on a predetermined minimum fastener bulb diameter Accordingly, there is a need in the art for an improved system and method for measuring and inspecting a bulb diameter of an installed one-sided fastener that verify if the bulb diameter is acceptable or not acceptable without requiring confined space entry, that reduce time and labor costs, that reduce ergonomic issues, that provide an improved automated measuring method and system that do not require a known distance from the installed one-sided fastener and do not require pixel counting in determining a bulb diameter measurement, and that provide advantages over known methods and systems.

SUMMARY

Example implementations of the present disclosure provide for an improved method and system for measuring and inspecting a bulb diameter of an installed one-sided fastener in a structure. As discussed in the below detailed description, versions of the improved method and system may provide significant advantages over known methods and systems.

In a version of the disclosure, there is provided a system for measuring a bulb diameter of an installed one-sided fastener in a structure. The system comprises the structure having a front side and a back side, and a plurality of holes formed through the structure. The system further comprises the installed one-sided fastener installed through one of the plurality of holes in proximity to an open hole of the plurality of holes. The installed one-sided fastener has a fastener body protruding from the back side of the structure, and the fastener body has a fastener bulb with the bulb diameter.

The system further comprises an optical imaging system. The optical imaging system comprises a probe having a probe tip coupled to a probe rod. The probe tip has a light element and a lens opening. The optical imaging system further comprises a camera sensor. The optical imaging system further comprises a linear axis slide coupled to the probe rod.

The system further comprises image data, taken and generated with the optical imaging system. The image data comprises at least a first image of the fastener bulb against the back side of the structure taken from a first position beyond the back side of the structure, and at least a second image of the fastener bulb against the back side of the structure taken from a second position positioned a predetermined distance from the first position.

The system further comprises a post image processing system, to process the image data, and to determine a bulb diameter measurement of the bulb diameter of the fastener bulb of the installed one-sided fastener. The post image processing system comprises an edge detection process, an ellipse fitting process, and a stereo vision process.

In another version of the disclosure, there is provided an automated system for measuring a bulb diameter of an installed one-sided fastener in an aircraft structure. The automated system comprises the aircraft structure having a front side and a back side, and a plurality of holes formed through the aircraft structure. The automated system further comprises the installed one-sided fastener installed through one of the plurality of holes in proximity to an open hole of the plurality of holes. The installed one-sided fastener has a fastener body protruding from the back side of the aircraft structure, and the fastener body has a fastener bulb with the bulb diameter.

The automated system further comprises an optical imaging system. The optical imaging system comprises a probe having a probe tip coupled to a probe rod. The probe tip has a light element and a lens opening. The optical imaging system further comprises a camera sensor. The optical imaging system further comprises a linear axis slide coupled to the probe rod.

The automated system further comprises image data, taken and generated with the optical imaging system. The image data comprises at least a first image of the fastener bulb against the back side of the aircraft structure taken from a first position beyond the back side of the aircraft structure, and at least a second image of the fastener bulb against the back side of the aircraft structure taken from a second position positioned a predetermined distance from the first position.

The automated system further comprises a post image processing system, to process the image data, and to determine a bulb diameter measurement of the bulb diameter of the installed one-sided fastener. The post image processing system comprises a control system comprising a computer system. The computer system comprises one or more computers. The computer system further comprises one or more computer software programs processed by the one or more computers. The one or more computer software programs execute one or more of an edge detection process, an ellipse fitting process, and a stereo vision process.

In another version of the disclosure, there is provided a method for measuring a bulb diameter of an installed one-sided fastener installed in a structure. The method comprises the step of positioning an optical imaging system at a front side of the structure directed at an open hole in the structure. The open hole is in proximity to the installed one-sided fastener installed in the structure. The optical imaging system comprises a probe having a probe tip coupled to a probe rod. The probe tip has a light element and a lens opening. The optical imaging system further comprises a camera sensor. The optical imaging system further comprises a linear axis slide coupled to the probe rod.

The method further comprises the step of inserting the probe tip through the open hole to a first position beyond a back side of the structure, so that the lens opening is directed at the installed one-sided fastener. The installed one-sided fastener has a fastener body protruding from the back side of the structure, and the fastener body has a fastener bulb with the bulb diameter.

The method further comprises the step of taking and generating, with the optical imaging system, from the first position, a first image of at least the fastener bulb against the back side of the structure. The method further comprises the step of moving the probe tip a predetermined distance from the first position to a second position beyond the back side of the structure, so that the lens opening is directed at the installed one-sided fastener. The method further comprises the step of taking and generating, with the optical imaging system, from the second position, a second image of at least the fastener bulb against the back side of the structure.

The method further comprises the step of processing the first image and the second image with a post image processing system, to determine a bulb diameter measurement of the bulb diameter of the fastener bulb of the installed one-sided fastener. The post image processing system comprises an edge detection process, an ellipse fitting process, and a stereo vision process.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description taken in conjunction with the accompanying drawings, which illustrate preferred and exemplary versions, but which are not necessarily drawn to scale. The drawings are examples and not meant as limitations on the description or claims.

FIG. 2A is an illustration of a partial sectional side view of an exemplary one-sided fastener that may be used in a version of a system and a method of the disclosure;

FIG. 2B is an illustration of a cross-sectional side view of an installed one-sided fastener installed in a structure;

FIG. 3B is an illustration of an enlarged side perspective view of a probe tip of the optical imaging system of FIG. 3A, positioned at a first position in proximity to an installed one-sided fastener at a back side of a structure;

FIG. 3C is an illustration of an enlarged side perspective view of the probe tip of FIG. 3B, moved to, and positioned at, a second position in proximity to the installed one-sided fastener of FIG. 3B;

FIG. 5A is an illustration of a side perspective view of a first image of an installed one-sided fastener installed in a structure, showing a first image ellipse fitted around an edge of a fastener bulb and showing first image major axis outer points;

FIG. 5B is an illustration of a side perspective view of a second image of the installed one-sided fastener and structure of FIG. 5A, with a second image ellipse fitted around an edge of the fastener bulb and showing second image major axis outer points;

Figure 1:
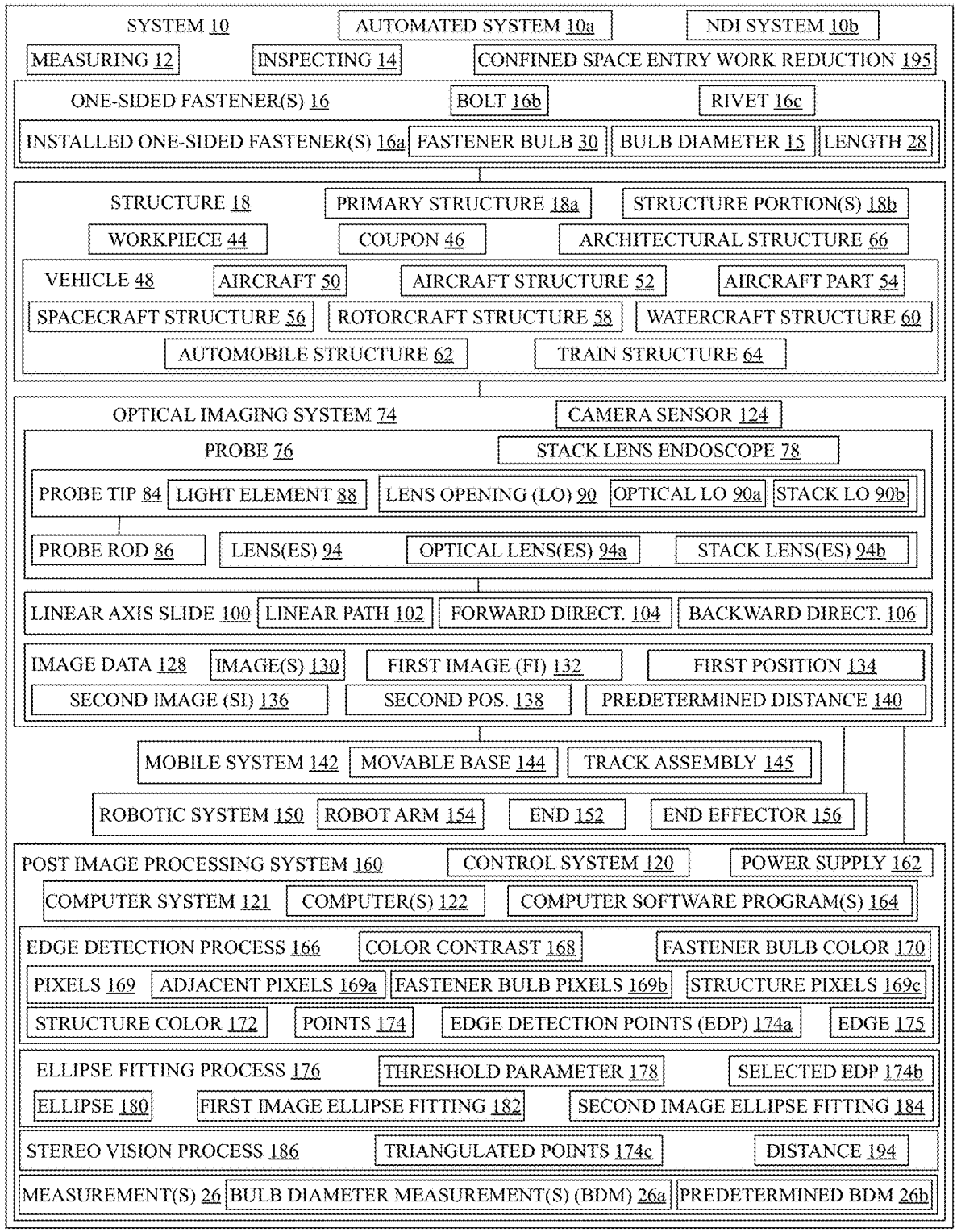
FIG. 1 is an illustration of a block diagram of an exemplary system of the disclosure.

The figures shown in this disclosure represent various aspects of the versions presented, and only differences will be discussed in detail.

DETAILED DESCRIPTION

Disclosed versions will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

This specification includes references to "one version" or "a version". The instances of the phrases "one version" or "a version" do not necessarily refer to the same version. Particular features, structures, or characteristics may be combined in any suitable manner consistent with this disclosure. All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

As used herein, "comprising" is an open-ended term, and as used in the claims, this term does not foreclose additional structures or steps.

As used herein, "configured to" means various parts or components may be described or claimed as "configured to" perform a task or tasks. In such contexts, "configured to" is used to connote structure by indicating that the parts or components include structure that performs those task or tasks during operation. As such, the parts or components can be said to be configured to perform the task even when the specified part or component is not currently operational (e.g., is not on).

As used herein, the terms "first", "second", etc., are used as labels for nouns that they precede, and do not imply any type of ordering (e.g., spatial, temporal, logical, etc.).

As used herein, an element or step recited in the singular and preceded by the word "a" or "an" should be understood as not necessarily excluding the plural of the elements or steps. As used herein, the term "and/or" includes any and all combinations of one or more of the associated listed items. As also used herein, the term "combinations thereof" includes combinations having at least one of the associated listed items, wherein the combination can further include additional, like non-listed items.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

Now referring to FIG. 1, FIG. 1 is an illustration of a block diagram of an exemplary system 10, such as an automated system 10*a*, of the disclosure, for measuring 12 and inspecting 14 a bulb diameter 15 of an installed one-sided fastener 16*a*, or installed one-sided fasteners 16*a*, installed in a structure 18. The blocks in FIG. 1 represent elements, and lines connecting the various blocks do not imply any particular dependency of the elements. Furthermore, the connecting lines shown in the various Figures contained herein are intended to represent example functional relationships and/or physical couplings between the various elements, but it is noted that other alternative or additional functional relationships or physical connections may be present in versions disclosed herein. One or more of these blocks may be combined, divided, or combined and divided into different blocks when implemented in an illustrative example. Further, the illustrations of the system 10 in FIG. 1 are not meant to imply physical or architectural limitations to the manner in which an illustrative example may be implemented. Other components in addition to, or in place of, the ones illustrated may be used. Some components may be unnecessary. As shown in FIG. 1, the system 10 comprises one or more one-sided fasteners 16, such as one or more installed one-sided fasteners 16*a*, installed in the structure 18. As used herein, "one-sided fastener", also referred to as "blind fastener", means a mechanical fastener typically joining two or more structural members or structure portions together, where the mechanical fastener is only readily accessible on a first exterior end of the mechanical fastener on a front side or an exterior side of the joined structural members, and a second interior end of the mechanical fastener protruding from a back side or an interior side of the joined structural members is not visible, is "blind", and is not readily accessible from the back side or the interior side of the joined structural members.

As shown in FIG. 1, the one-sided fastener 16 may comprise a bolt 16*b*, a rivet 16*c*, or another suitable one-sided fastener 16. An exemplary one-sided fastener 16 is discussed in further detail below with respect to FIG. 2A. An exemplary installed one-sided fastener 16*a* is discussed in further detail below with respect to FIG. 2B. As shown in FIGS. 2A-2B, each one-sided fastener 16 (see FIG. 2A), such as each installed one-sided fastener 16*a* (see FIG. 2B), has a first end 20, such as a head end 20*a*, a second end 22, such as a tail end 22*a*, and a fastener body 24, such as a shaft body 24*a*, formed between the first end 20 and the second end 22.

The system 10 is used to generate or obtain a measurement 26 (see FIG. 1), such as a bulb diameter measurement (BDM) 26*a* (see FIG. 1), that can be compared to a predetermined bulb diameter measurement (BDM) 26*b* (see FIG. 1), to either accept the bulb diameter 15 and the fastener bulb 30 of the installed one-sided fastener 16*a*, if the bulb diameter measurement 26*a* is greater than, or equal to, the predetermined bulb diameter measurement 26*b*, or to reject the bulb diameter 15 and the fastener bulb 30 of the installed one-sided fastener 16*a*, if the bulb diameter measurement 26*a* is less than the predetermined bulb diameter measurement 26*b*.

The bulb diameter measurement 26*a* includes a length 28 (see FIG. 1) of the bulb diameter 15 (see FIG. 1) of a fastener bulb 30 (see FIG. 1) of the installed one-sided fastener 16*a*. The fastener body 24 of the installed one-sided fastener 16*a* has the fastener bulb 30 with the bulb diameter 15. As used herein, "fastener bulb" means when a fastener is installed in a structure, a sleeve of the fastener is compressed, causing it to fold outwards to form a bulb configuration which is formed against a back side of the structure.

As shown in FIG. 1, the system 10 further comprises the structure 18. In one version, the structure 18 comprises a primary structure 18a (see FIGS. 1, 2B). As used herein, "primary structures" for aerospace or flight vehicles, such as aircraft, include components that are needed to sustain flight and ground loads, such as fuselage, wings, tail, and landing gear.

Figure 2C:
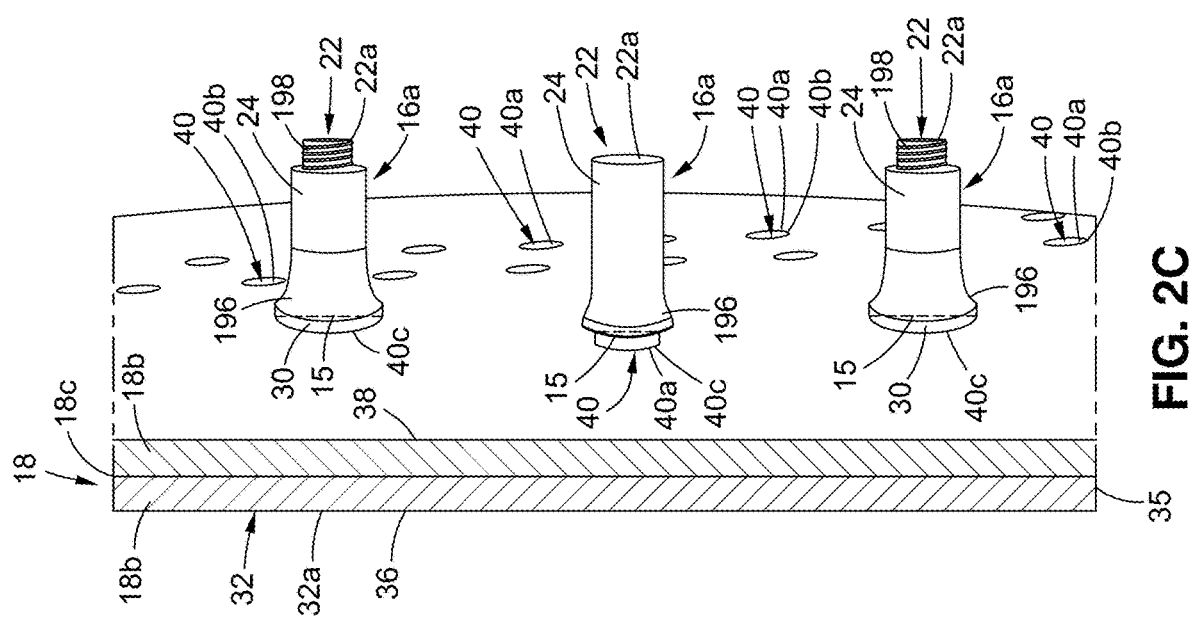
FIG. 2C is an illustration of a perspective side view of installed one-sided fasteners installed in a structure.
Figure 3A:
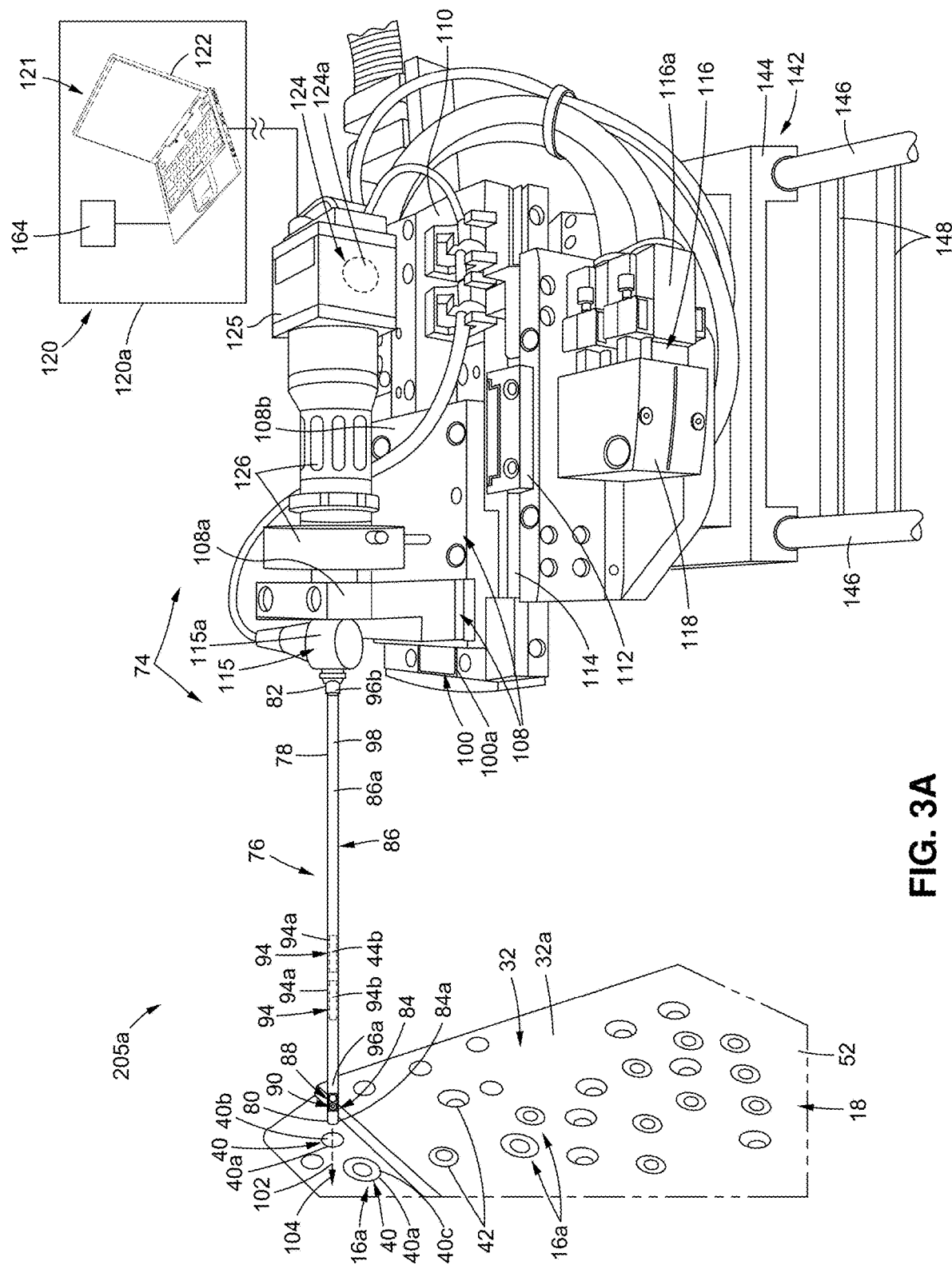
FIG. 3A is an illustration of a side perspective view of a version of an optical imaging system that can be used in a version of a system of the disclosure, where the optical imaging system is coupled to a mobile system.
Figure 3D:
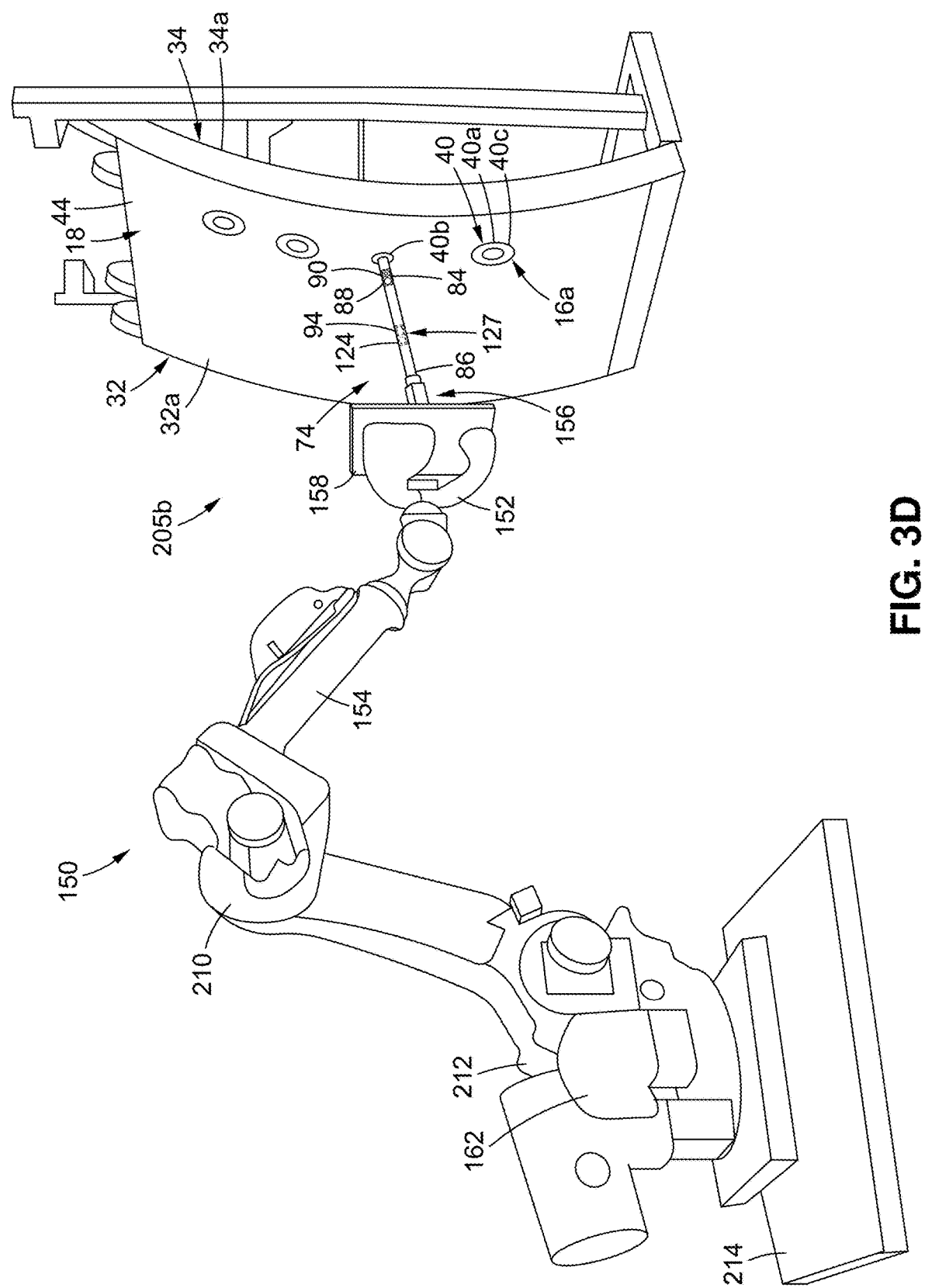
FIG. 3D is an illustration of a side perspective view of another version of an optical imaging system that can be used in a version of a system of the disclosure, where the optical imaging system is coupled to a robotic system.

In one version, the structure 18 is comprised of two structure portions 18b (see FIGS. 1, 2B, 2C) joined together to form a joined structure 18c (see FIGS. 2B, 2C). In another version, as shown in FIG. 3D, the structure 18 comprises one structure portion 18b.

As shown in FIGS. 2B, 2C, the structure 18 has a first side 32, such as a front side 32a, a second side 34, such as a back side 34a, and a structure body 35 formed between the first side 32 and the second side 34. The structure 18 further has an exterior surface 36 (see FIGS. 2B, 2C, 3A) and an interior surface 38 (see FIGS. 2B, 2C). As shown in FIGS. 2A, 2C, 3A, the structure 18 has one or more holes 40, such as one or more through holes 40a, that are drilled, or formed, through the structure 18. Each hole 40 is of a suitable size and dimension to receive the one-sided fastener 16. The hole 40 comprises an open hole 40b (see FIGS. 2C, 3A) when there is not an installed one-sided fastener 16a installed through the hole 40. The hole 40 comprises a filled hole 40c (see FIGS. 2B, 3A) when the installed one-sided fastener 16a is installed through the hole 40. FIG. 3A shows installed one-sided fasteners 16a installed through the holes 40 in the structure 18. As shown in FIG. 3A, the installed one-sided fastener 16a to be measured or inspected is in proximity to an open hole 40b of the plurality of holes 40.

As shown in FIGS. 2B, 2C, the fastener body 24, or a portion of the fastener body 24, and the second end 22 of each installed one-sided fastener 16a protrudes, or extends, from the second side 34, such as the back side 34a, of the structure 18, when installed in the structure 18. As shown in FIGS. 3B, 3C, the installed one-sided fastener 16a has the fastener body 24 protruding from the back side 34a of the structure 18. The one or more installed one-sided fasteners 16a have one or more locations 42 (see FIG. 3A) of installation in the structure 18.

As shown in FIG. 1, the structure 18 may comprise a workpiece 44 or a coupon 46. As used herein, "workpiece" means an object, such as a piece of raw material, that is worked on with a tool or machine and that is in the process of being formed into a part or component. As used herein, "coupon", also referred to as "test coupon", means an object similar to a part to be manufactured and subject to the same manufacturing processes as the part and typically used to test qualities for quality assurance, and an example of a coupon may be a laminated composite test coupon.

As further shown in FIG. 1, the structure 18 may comprise a structure 18, such as a workpiece 44, of a vehicle 48, such as an aircraft 50 (see also FIG. 8), for example, an aircraft structure 52 or an aircraft part 54. As shown in FIG. 1, the structure 18 may also be part of another vehicle 48, for example, a spacecraft structure 56 of a spacecraft, a rotorcraft structure 58 of a rotorcraft, a watercraft structure 60 of a watercraft, an automobile structure 62 of an automobile, a train structure 64 of a train, or another suitable vehicle structure. As further shown in FIG. 1, the structure 18 may also comprise an architectural structure 66.

In these illustrative examples, the system 10 is used to inspect the structure 18, such as the workpiece 44, the coupon 46, the aircraft structure 52, the aircraft part 54, or the other suitable structures. The structure 18 may be selected from any number of different types of objects. For example, without limitation, the structure 18 may take the form of a mobile platform, a stationary platform, an air-based structure, a land-based structure, an aquatic-based structure, a space-based structure, or some other suitable type of structure. More specifically, the structure 18 may be the vehicle 48 or the architectural structure 66. In some cases, the structure 18 may be a part in another object, for example, with the aircraft structure 52 or aircraft part 54 of an aircraft 50, a section of a fuselage 68 (see FIG. 8) for the aircraft 50, a wing 70 (see FIG. 8) for the aircraft 50, or a tail 72 (see FIG. 8) for the aircraft 50. In other cases, the structure 18 may be a part in another object, for example, with the architectural structure 66, a building wall, a door, or a panel, a structural support on a bridge, or some other suitable type of part.

As shown in FIG. 1, the system 10 further comprises an optical imaging system 74. As shown in FIG. 1, the optical imaging system 74 comprises a probe 76 (see also FIG. 3A). One exemplary version of the probe 76 comprises a stack lens endoscope 78 (see FIGS. 1, 3A). The optical imaging system 74 may also comprise another suitable probe device or endoscope device. The probe 76, such as the stack lens endoscope 78, has a distal end 80 (see FIG. 3A) and a proximal end 82 (see FIG. 3A). As further shown in FIG. 1, the probe 76 comprises a probe tip 84 (see also FIGS. 3A-3C) coupled to, or integral with, a probe rod 86 (see also FIG. 3A).

The probe tip 84 is at the distal end 80 of the probe 76. In one version, as shown in FIGS. 3B, 3C, the probe tip 84 comprises an endoscope probe tip 84a. The probe 76 may also have another suitable probe tip. In one version, the probe tip 84, such as the endoscope probe tip 84a, has a light element 88 (see FIGS. 1, 3A-3C), for example, a light-emitting diode (LED) light element 88a (see FIGS. 3B, 3C), or another suitable light element, housed within the probe tip 84, and configured to illuminate the area to be imaged with the optical imaging system 74. In one version, as shown in FIG. 1, the probe tip 84, such as the endoscope probe tip 84a, further has a lens opening (LO) 90 (see also FIGS. 3A-3C), such as an optical lens opening (LO) 90a (see also FIGS. 3B, 3C), for example, a stack lens opening (LO) 90b (see also FIG. 3B), or another suitable lens opening, housed within the probe tip 84. As shown in FIGS. 3B, 3C, in one version, the lens opening 90 is positioned in proximity to, or next to, the light element 88, within the probe tip 84 interior and the lens opening 90 and the light element 88 face out a window 92 of the probe tip 84. In another version, the lens opening 90 and the light element 88 may be positioned in a different configuration. In one version, as shown in FIG. 3A, the lens opening 90 is coupled to, or near to, one or more lenses 94 (see also FIG. 1), such as one or more optical lenses 94a (see also FIG. 1), for example, one or more stack lenses 94b (see also FIG. 1), housed within the probe rod 86 (see FIG. 3A). In another version, as shown in FIG. 3D, the lens opening 90 is coupled to, or near to, an integrated camera 127 having a camera sensor 124 (see also FIG. 1) and one or more lenses 94 integrated within, and housed within, an interior of the probe rod 86. In various versions, the camera sensor 124 (see FIG. 3A) may be coupled external to the probe rod 86, via one or more added structures, for example, one or more couplings 115 (see FIG. 3A), or the camera sensor 124 (see FIG. 3D) may be coupled to, or integrated within, the probe rod 86 (see FIG. 3D), or the camera sensor 124 may be positioned in another configuration external to the probe 76.

As shown in FIG. 3A, the probe rod 86 extends between the probe tip 84 and the proximal end 82 of the probe 76. As shown in FIG. 3A, the probe rod 86 comprises a first end 96*a* and a second end 96*b*. In one version, the probe rod 86 comprises an endoscope probe rod 86*a* (see FIG. 3A). The endoscope probe rod 86*a* is coupled to, or integral with, the endoscope probe tip 84*a*. Preferably, the probe rod 86 is in the form of an elongated tube 98 (see FIG. 3A). In one version, as shown in FIG. 3A, the lenses 94, such as the stack lenses 94*b*, are housed in the interior of the elongated tube 98 of the probe rod 86. In another version, as shown in FIG. 3D, the integrated camera 127, with the lens 94 and the camera sensor 124, is housed in the interior of the elongated tube 98 of the probe rod 86.

As shown in FIG. 1, in one version, the optical imaging system 74 further comprises a linear axis slide 100 (see also FIG. 3A), such as a high precision linear axis slide 100*a* (see FIG. 3A), also referred to as a linear motion slide or a linear motion guide, that functions as a precise and controlled actuator device to control linear motion of the probe 76. In other versions, the optical imaging system 74 includes another suitable actuator device, such as a high precision actuator device. As shown in FIG. 3A, the linear axis slide 100, such as the high precision linear axis slide 100*a*, is coupled, or attached, to the proximal end 82 of the probe 76, and in particular, is coupled, or attached, to the second end 96*b* of the probe rod 86. The linear axis slide 100, such as the high precision linear axis slide 100*a*, is configured to move, and moves, the probe 76, including the probe tip 84 and the probe rod 86, in a linear path 102 (see FIGS. 1, 3A), such as along a linear axis, in both a forward direction (DIRECT.) 104 (see FIGS. 1, 3A) and a backward direction (DIRECT.) 106 (see FIG. 1).

In one exemplary version, as shown in FIG. 3A, the linear axis slide 100, such as the high precision linear axis slide 100*a*, comprises a movable carriage 108 positioned on a platform base 110. In one version, the movable carriage 108 comprises a movable carriage first portion 108*a* (see FIG. 3A), or vertical block portion, coupled to a movable carriage second portion 108*b* (see FIG. 3A), or base block portion, and the movable carriage 108 is further coupled to one or more guides 112 that travel linearly along one or more guide rails 114. The guide rails 114 comprise flat surfaces. The movable carriage 108 supports the probe 76, and the movable carriage first portion 108*a*, as shown in FIG. 3A, is coupled to the proximal end 82 of the probe 76, and in particular, is coupled to the second end 96*b* of the probe rod 86, via a coupling 115, such as a probe mount coupling 115*a*.

In one version, the movable carriage 108 is driven with a drive unit 116 (see FIG. 3A), such as a powered drive unit 116*a* (see FIG. 3A), for example, a linear motor 118 (see FIG. 3A), that generates a force, such as a mechanical force or an electromagnetic force, to move the movable carriage 108 along the one or more guide rails 114. In other versions, the drive unit 116 may comprise a belt drive, a rack and pinion drive, a lead screw, a ball screw, a pneumatic system drive, or another suitable type of drive unit, depending on factors such as load capacity, speed, and accuracy requirements. Another type of linear axis slide or another suitable actuator device may be manually driven by pushing and pulling, or by machines such as a hand crank leadscrew.

In one version, the linear axis slide 100, such as the high precision linear axis slide 100*a*, is remotely controlled with a control system 120 (see FIG. 3A), such as an electronic control system 120*a* (see FIG. 3A), that includes a computer system 121 with one or more computers 122. In other versions, the linear axis slide 100, such as the high precision linear axis slide 100*a*, may be controlled with a controller on or near the linear axis slide 100, may be controlled with a computer numerical control (CNC) system, may be controlled with a programmable logic controller (PLC), or may be controlled with another suitable control system. Alternatively, another type of linear axis slide or another suitable actuator device may be manually controlled. The control system 120 controls a speed, a direction, and a position of the linear axis slide 100.

In one version, the movable carriage 108 is guided by bearings (not shown), for example, bearings comprising metal-to-metal linear slide bearings having two metal surfaces in direct contact with each other. In other versions, the bearings may comprise ball bearings, magnetic bearings, or other suitable types of bearings. The linear axis slide 100, such as the high precision linear axis slide 100*a*, may further comprise one or more additional components such as sensors, for example, position sensors, as well as limit switches, impact dampers, or other suitable components existing in the art of linear axis slide devices.

The linear axis slide 100, such as the high precision linear axis slide 100*a*, shown in FIG. 3A, is an example of a version of a linear axis slide that may be used in the optical imaging system 74 of the system 10 disclosed herein. However, other suitable versions of a linear axis slide may be used in the optical imaging system 74 of the system 10.

As shown in FIG. 1, the optical imaging system 74 further comprises the camera sensor 124 (see also FIGS. 3A, 3D), such as an optical image camera sensor 124*a* (see FIG. 3A). In one version, the camera sensor 124, such as the optical image camera sensor 124*a*, may comprise a complementary metal-oxide semiconductor (CMOS) optical image camera sensor that captures visible light through a lens as an electronic signal that is converted to a digital reading recorded to an internal memory or a remotely connected device. In another version, the camera sensor 124, such as the optical image camera sensor 124*a*, may comprise a charged coupled device (CCD) optical image camera sensor, which is an electronic sensor that converts light to digital signals through charges generated by photons on an integrated circuit containing an array of coupled capacitors to produce a digital image. In other versions, the camera sensor 124, such as the optical image camera sensor 124*a*, may comprise another suitable type of camera sensor.

In one version, as shown in FIG. 3A, the camera sensor 124, such as the optical image camera sensor 124*a*, is housed within a camera hardware device 125. The camera sensor 124 may also be housed, incorporated, or integrated in another suitable optical hardware device. The camera hardware device 125 is coupled to the movable carriage first portion 108*a* of the movable carriage 108 and is coupled to the probe 76, via one or more camera attachment devices 126 (see FIG. 3A), such as a turn knob connector or an adapter or other suitable camera attachment devices. The movable carriage 108 supports the camera hardware device 125. In one version, as shown in FIG. 3A, the camera sensor 124, such as the optical image camera sensor 124*a*, is coupled to the lenses 94 housed in the probe rod 86, and in turn, the lenses 94 are coupled to, or near to, the lens opening 90. As shown in FIG. 3A, the camera sensor 124, such as the optical image camera sensor 124*a*, is also coupled to the control system 120, such as the electronic control system 120*a*, having the computer system 121 with the computer 122 and with the one or more computer software programs 164 executed by the computer 122.

In another version, as shown in FIG. 3D, the camera sensor 124 is integrated or housed within the probe rod 86 of the optical imaging system 74 and is part of an integrated camera 127 integrated within the probe rod 86. As shown in FIG. 3D, the integrated camera 127 integrated in the probe rod 86 includes the camera sensor 124, one or more lenses 94, and other suitable camera components. Alternatively, the optical imaging system 74 shown in FIG. 3D may comprise the camera sensor 124 external to the probe 76 and the probe rod 86, such as shown in FIG. 3A. In addition, the optical imaging system 74 shown in FIG. 3A may comprise the camera sensor 124 and the lens 94 integrated in the integrated camera 127 shown in FIG. 3D, where the camera sensor 124 is integrated in the probe rod 86 and internal in the probe rod 86. In another version, the camera sensor 124 of the optical imaging system 74 may be positioned external to the probe 76 in another suitable configuration.

In another version, the optical imaging system 74 may comprise a portable optical imaging system that can be transported or carried from one production or inspection site to another production or inspection site. The portable optical imaging system may be stored in a carrying case or other suitable storage apparatus for ease and flexibility of use.

As shown in FIG. 1, the system 10 further comprises image data 128 taken with, and by, the optical imaging system 74, and generated with, and by, the optical imaging system 74, such as taken and generated with the camera sensor 124 (see FIG. 3A), with the one or more lenses 94 (see FIG. 3A), and with the lens opening 90 (see FIG. 3A), or alternatively, with the integrated camera 127 (see FIG. 3D) having the camera sensor 124 (see FIG. 3D) and the lens 94. As shown in FIG. 1, the image data 128 comprises two or more images 130, such as at least a first image (FI) 132 (see also FIG. 5A) of the fastener bulb 30 against the back side 34a of the structure 18 taken from a first position 134 (see also FIGS. 3B, 3C) positioned beyond the back side 34a of the structure 18, and such as at least a second image (SI) 136 of the fastener bulb 30 against the back side 34a of the structure 18 taken from a second position (POS.) 138 positioned a predetermined distance 140 (see also FIG. 3C) from the first position 134. The image data 128 generated from the optical imaging system 74 comprises two or more images 130, such as the first image 132 and the second image 136, of an installed one-sided fastener 16a, and in particular, two or more images 130, such as the first image 132 and the second image 136, of the fastener bulb 30 of the installed one-sided fastener 16a positioned in relation to, or against, the back side 34a of the structure 18. In one version, multiple images 130, such as three (3) to five (5), or more, images 130 may be taken of the first image 132 at the first position 134 and each image 130 of the multiple first images 132 is processed, and multiple images 130, such as three (3) to five (5), or more, images 130 may be taken of the second image 136 at the second position 138 and each image 130 of the multiple second images 136 is processed.

The optical imaging system 74 may be supported on various support structures and positioned with respect to the structure 18 with the one or more installed one-sided fasteners 16a in various ways. For example, as shown in FIGS. 1, 3A, in one version, the optical imaging system 74 is attached, or coupled, to a mobile system 142. In one version, the mobile system 142 comprises a movable base 144 (see FIGS. 1, 3A) configured to move along a track assembly 145 (see FIGS. 1, 3A), such as with rails 146 (see FIG. 3A) and a track 148 (see FIG. 3A). In another version, the mobile system 142 may comprise another suitable movable assembly. In particular, as shown in FIG. 3A, the optical imaging system 74 is attached, or coupled, to the movable base 144 of the mobile system 142. In another version, the optical imaging system 74 may be coupled or positioned on a stationary support structure, such as a table, a platform, a mounting plate, or other suitable stationary support structures.

As further shown in FIGS. 1, 3D, in another version, the optical imaging system 74 is attached, or coupled, to a robotic system 150, and in particular, is attached, or coupled, at an end 152 of a robot arm 154 of the robotic system 150. The optical imaging system 74 may be considered to be an end effector 156 (see FIGS. 1, 3D). As shown in FIG. 3D, the optical imaging system 74 is attached to a support mount 158 at the end 152 of the robot arm 154. The robotic system 150 is discussed in further detail below with respect to FIG. 3D.

As shown in FIG. 1, the system 10 further comprises a post image processing system 160. The post image processing system 160 is configured to process, and processes, the image data 128, and is configured to determine, and determines the measurement 26, such as the bulb diameter measurement 26a, of the bulb diameter 15 of the fastener bulb 30 of the installed one-sided fastener 16a. As shown in FIG. 1, in one version, the post image processing system 160 comprises the control system 120 and at least one power supply 162. As shown in FIGS. 1, 3A, the control system 120, in one version, comprises the computer system 121 having one or more computers 122 and one or more computer software programs 164 processed by, or executed by, the one or more computers 122. Depending on the implementation, the computer system 121 may be configured to control one or more of, the optical imaging system 74, the mobile system 142 or the robotic system 150, the post image processing system 160, or other components of the system 10. For example, the computer system 121 may send commands to the optical imaging system 74 to control the linear axis slide 100, the camera sensor 124, or another component of the optical imaging system 74. The computer system 121, or a human operator, may use the images 130 generated by the optical imaging system 74 and process the images 130 using the one or more computer software programs 164 of the post image processing system 160, to obtain the bulb diameter measurement 26a (see FIG. 1) of the bulb diameter 15 (see FIGS. 1, 2B) of the fastener bulb 30 (see FIGS. 1, 2B) of the installed one-sided fasteners 16a.

The at least one power supply 162 (see FIG. 1) provides or supplies power to one or more components of the system 10, such as the optical imaging system 74, the computer system 121, including the one or more computers 122, the mobile system 142 or the robotic system 150, the post image processing system 160, or other components of the system 10. The at least one power supply 162 may comprise an electrical power supply, a battery power supply, a solar power supply, or another suitable power supply or power source to provide power to components of the system 10.

As shown in FIG. 1, the post image processing system 160 further comprises an edge detection process 166, such as an edge detection algorithm, executed by one of the one or more computer software programs 164. The edge detection process 166 is configured to detect, and detects, for each of the first image 132 and the second image 136, a color contrast 168 (see FIGS. 1, 4B, 5A-5B) between pixels 169 (see FIG. 1), such as adjacent pixels 169a (see FIG. 1), of the fastener bulb 30 and the structure 18. The pixels 169 of the fastener bulb 30 comprise fastener bulb pixels 169b (see FIG. 1), and the pixels 169 of the structure 18 comprise structure pixels 169c (see FIG. 1). As shown in FIG. 1, the fastener bulb 30 also has a fastener bulb color 170, and the structure 18 has a structure color 172. There is also a color contrast 168 between the fastener bulb color 170 and the structure color 172.

The edge detection process 166 is further configured to generate, and generates, for each of the first image 132 and the second image 136, at least a plurality of points 174 (see FIGS. 1, 4B, 5A-5B), such as a plurality of edge detection points (EDP) 174*a* (see FIGS. 1, 4B, 5A-5B), at an edge 175 (see FIGS. 1, 4B, 5A-5B) of the fastener bulb 30 between the fastener bulb 30 and the structure 18. The edge detection process 166, such as an edge detection algorithm, gathers or generates points 174, such as the edge detection points 174*a*, within the fastener interest area, such as the fastener bulb 30, using the color contrast 168 (see FIG. 1) between the adjacent pixels 169*a* (see FIG. 1), of the fastener bulb 30 and the structure 18, including the color contrast 168 between the structure color 172 and the fastener bulb color 170. The edge detection process 166 is discussed in further detail below with respect to FIGS. 4B, 5A-5B.

As shown in FIG. 1, the post image processing system 160 further comprises an ellipse fitting process 176, such as an ellipse fitting algorithm, executed by one of the one or more computer software programs 164. The ellipse fitting process 176 is configured to use, and uses, a threshold parameter 178 (see FIG. 1) to fit an ellipse 180 (see FIGS. 1, 4C, 5A-5B) around selected edge detection points (EDP) 174*b* (see FIGS. 1, 4C, 5A-5B) of the points 174, such as the plurality of edge detection points 174*a*, in both the first image 132 (see FIGS. 1, 5A) and the second image 136 (see FIGS. 1, 5B), to obtain a first image ellipse fitting 182 (see FIGS. 1, 5A) and a second image ellipse fitting 184 (see FIGS. 1, 5B). In one version, the threshold parameter 178 comprises a predetermined number of selected edge detection points 174*b* of the edge detection points 174*a*, where the selected edge detection points 174*b* define a line representing the ellipse 180 that is fit around the fastener bulb 30, where the selected edge detection points 174*b* are used to be the best fit into an ellipse 180. The ellipse fitting process 176 is discussed in further detail below with respect to FIGS. 4C, 5A-5B.

As shown in FIG. 1, the post image processing system 160 further comprises a stereo vision process 186, such as a stereo vision algorithm, executed by one of the one or more computer software programs 164. The stereo vision process 186 is configured to triangulate, and triangulates, first image major axis outer points 188 (see FIGS. 5A, 5C) of a major axis 190*a* (see FIG. 5C) of the ellipse 180 (see FIGS. 5A, 5C), such as the first image ellipse 180*a* (see FIGS. 5A, 5C), of the first image ellipse fitting 182 (see FIGS. 5A, 5C), and is configured to triangulate, and triangulates, second image major axis outer points 192 (see FIG. 5C) of a major axis 190*b* (see FIG. 5C) of the ellipse 180 (see FIGS. 5B, 5C), such as the second image ellipse 180*b* (see FIGS. 5B, 5C), of the second image ellipse fitting 184, to obtain triangulated points 174*c* (see FIGS. 1, 5C, 5D), such as two (2) triangulated points 174*c*, and such as three-dimensional (3D) triangulated points 174*d* (see FIGS. 5C, 5D). The stereo vision process 186, such as the stereo vision algorithm, is further configured to calculate, and calculates, a distance 194 (see FIGS. 1, 5D) between the two triangulated points 174*c* (see FIG. 5D), such as the three-dimensional (3D) triangulated points 174*d* (see FIG. 5D), to determine the measurement 26 (see FIG. 1), such as the bulb diameter measurement 26*a* (see FIG. 1), of the bulb diameter 15 (see FIG. 1) of the fastener bulb 30 of the installed one-sided fastener 16*a*.

In one version, when multiple images 130, such as three (3) to five (5), or more, images 130 are taken of the first image 132 at the first position 134, and multiple images 130, such as three (3) to five (5), or more, images 130 are taken of the second image 136 at the second position 138, each of the multiple first images 132 and each of the multiple second images 136 are processed with the edge detection process 166, the ellipse fitting process 176, and the stereo vision process 186, to obtain multiple measurements 26 (see FIG. 1), such as multiple bulb diameter measurements 26*a* (see FIG. 1), of the bulb diameter 15 (see FIG. 1) of the fastener bulb 30 of the installed one-sided fastener 16*a*. The stereo vision process 186 is configured to triangulate, and triangulates, all possible combinations of the multiple first images 132 and the multiple second images 136. For example, for three (3) first images 132 taken and processed, and three (3) second images 136 taken and processed, nine (9) bulb diameter measurements 26*a* are obtained across all combinations, and an average bulb diameter measurement 26*a* may be averaged from the nine (9) bulb diameter measurements 26*a* and obtained and used.

The image data 128 from the optical imaging system 74 is generated, in real time, in response to detecting, or receiving, the images 130 of the one or more installed one-sided fasteners 16*a*, for example, the fastener bulb 30 of each of the one or more installed one-sided fasteners 16*a*. Although the image data 128 is generated in real time, the image data 128 comprising the images 130 still needs to be sent to the computer 122 (see FIGS. 1, 3A) of the computer system 121 (see FIGS. 1, 3A) for processing. The image data 128 is processed, measured, and analyzed with the post image processing system 160, to obtain the measurement 26, such as the bulb diameter measurement 26*a*, of the bulb diameter 15 of the fastener bulb 30 of the installed one-sided fastener 16*a*.

The bulb diameter measurement 26*a* (see FIG. 1) can be compared to the predetermined bulb diameter measurement 26*b* (see FIG. 1), to either accept the bulb diameter 15 and the fastener bulb 30 of the installed one-sided fastener 16*a*, if the bulb diameter measurement 26*a* is greater than, or equal to, the predetermined bulb diameter measurement 26*b*, or to reject the bulb diameter 15 and the fastener bulb 30 of the installed one-sided fastener 16*a*, if the bulb diameter measurement 26*a* is less than the predetermined bulb diameter measurement 26*b*. Having the capability to measure the bulb diameter 15 with the system 10 disclosed herein provides a confined space entry work reduction 195 (see FIG. 1), that is, a reduction in having an operator, a worker, a mechanic, an inspector, a robot, or another user or automated apparatus, perform confined space entry work in a confined space in, for example, a structure 18, such as an aircraft structure 52 (see FIG. 8), for example, a fuel tank in a wing 70 (see FIG. 8) of an aircraft 50 (see FIG. 8).

In addition, the system 10 is an example of a nondestructive inspection (NDI) system 10*b* (see FIG. 1) that uses the optical imaging system 74 and the post image processing system 160 to measure, inspect, and analyze an object, in this case, the installed one-sided fasteners 16*a*, to perform nondestructive inspection (NDI), without causing any undesired effects to the structure 18 or to the one or more installed one-sided fasteners 16*a*.

Figure 8:
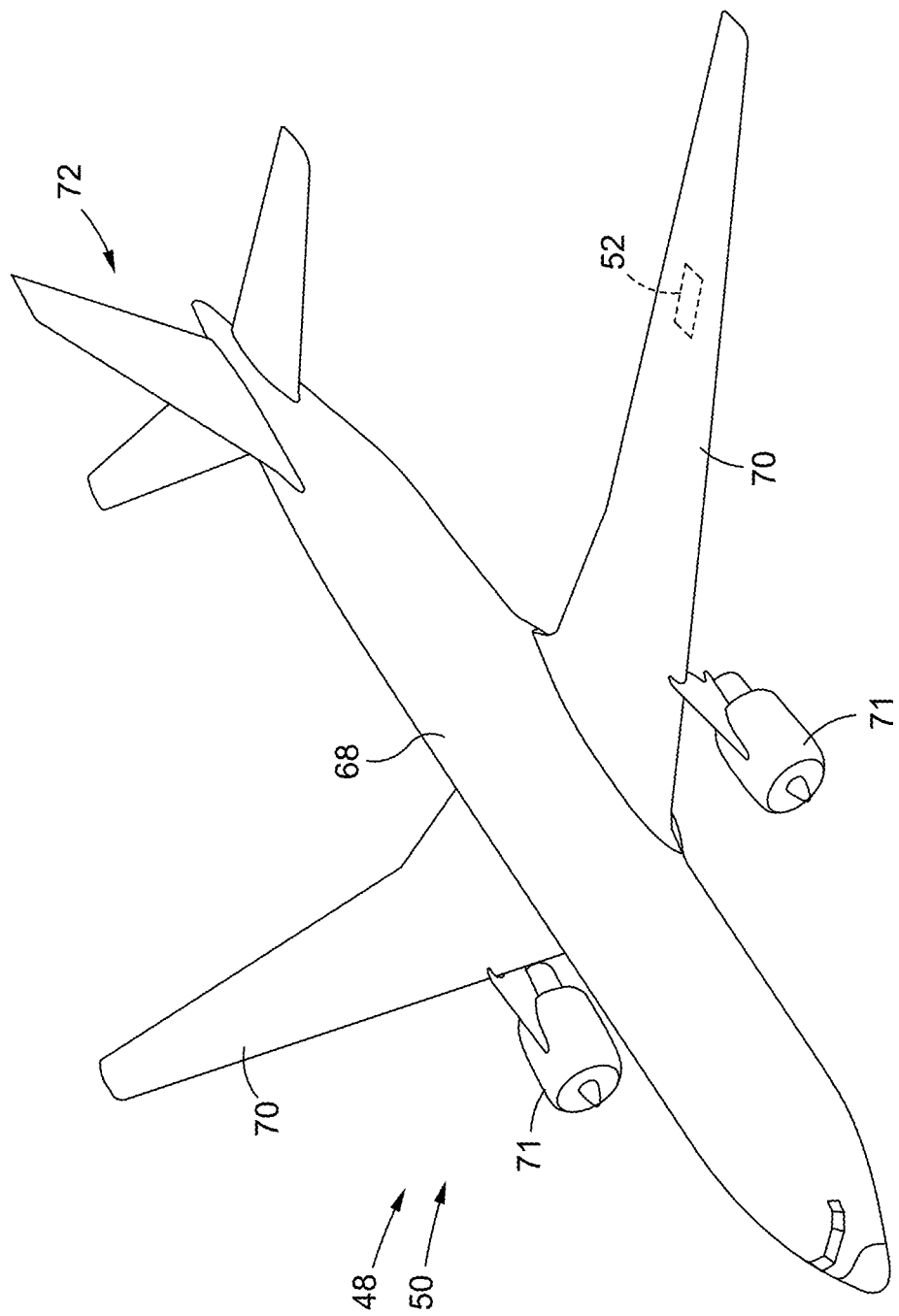
FIG. 8 is an illustration of a perspective view of an aircraft that incorporates aircraft structures having installed one-sided fasteners that can be measured with a system and a method of the disclosure.

In another version of the disclosure, there is provided an automated system 10*a* (see FIG. 1) for measuring the bulb diameter 15 (see FIG. 1) of an installed one-sided fastener 16*a* (see FIGS. 1, 2B) in an aircraft structure 52 (see FIGS. 1, 8). The automated system 10*a* (see FIG. 1) comprises the structure 18 (see FIGS. 1, 2B), such as the aircraft structure 52 (see FIGS. 1, 3A, 8), having the front side 32a (see FIGS. 2B, 3A) and the back side 34a (see FIGS. 2B, 3B), and the plurality of holes 40 (see FIGS. 2B-2C) formed through the structure 18, for example, the aircraft structure 52. The automated system 10a further comprises the installed one-sided fastener 16a (see FIGS. 1, 2B, 2C) installed through one of the plurality of holes 40 (see FIGS. 2C, 3A) in proximity to an open hole 40b (see FIGS. 2C, 3A) of the plurality of holes 40. The installed one-sided fastener 16a has the fastener body 24 (see FIGS. 2B, 2C, 3B, 3C) protruding from the back side 34a of the structure 18, for example, the aircraft structure 52, and the fastener body 24 has the fastener bulb 30 (see FIGS. 2B, 2C, 3B, 3C) with the bulb diameter 15 (see FIGS. 2B, 2C, 3B, 3C).

The automated system 10a further comprises the optical imaging system 74 (see FIGS. 1, 3A, 3D) comprising the probe 76 having the probe tip 84 (see FIGS. 1, 3A) coupled to the probe rod 86 see FIGS. 1, 3A). The probe tip 84 has the light element 88 (see FIGS. 1, 3A) and the lens opening 90 (see FIGS. 1, 3A). The optical imaging system 74 further comprises the camera sensor 124 (see FIGS. 1, 3A) in one version, positioned external to the probe 76 and coupled to one or more lenses 94 in the probe 76, or in another version, as part of an integrated camera 127 (see FIG. 3D) integrated in the probe rod 86, or in another version, positioned external to the probe 76 in another suitable configuration. The optical imaging system 74 further comprises the linear axis slide 100 coupled to the probe 76, such as coupled to the probe rod 86 (see FIGS. 1, 3A).

In one version, the optical imaging system 74 of the automated system 10a may be attached to the movable base 144 (see FIGS. 1, 3A) of the mobile system 142 (see FIGS. 1, 3A). In another version, the optical imaging system 74 of the automated system 10a may be attached at the end 152 (see FIGS. 1, 3D) of the robot arm 154 (see FIGS. 1, 3D) of the robotic system 150 (see FIGS. 1, 3D).

The automated system 10a further comprises the image data 128 (see FIG. 1), taken and generated with the optical imaging system 74. The image data 128 comprises at least the first image 132 (see FIGS. 1, 5A) of the fastener bulb 30 taken against the back side 34a of the structure 18, such as the aircraft structure 52, and taken from the first position 134 (see FIG. 3B) positioned beyond the back side 34a of the aircraft structure 52, and further comprises at least the second image 136 (see FIGS. 1, 5B) of the fastener bulb 30 taken against the back side 34a of the structure 18, such as the aircraft structure 52, and taken from the second position 138 (see FIG. 3C) positioned a predetermined distance 140 (see FIG. 3C) from the first position 134.

The automated system 10a further comprises, as discussed above, the post image processing system 160 (see FIG. 1), to process the image data 128, and to determine the bulb diameter measurement 26a (see FIG. 1) of the bulb diameter 15 of the installed one-sided fastener 16a. The post image processing system 160 comprises the control system 120 (see FIGS. 1, 3A). The control system 120 comprises the computer system 121 (see FIGS. 1, 3A). The computer system 121 comprises one or more computers 122 (see FIGS. 1, 3A). The computer system 121 further comprises one or more computer software programs 164 (see FIGS. 1, 3A) processed by the one or more computers 122. The one or more computer software programs 164 execute one or more of, the edge detection process 166 (see FIG. 1), the ellipse fitting process 176 (see FIG. 1), and the stereo vision process 186 (see FIG. 1).

The edge detection process 166, as discussed above, is configured to detect, and detects, for each of the first image 132 and the second image 136, the color contrast 168 (see FIGS. 1, 4B) between the pixels 169 (see FIG. 1), such as the adjacent pixels 169a (see FIG. 1), of the fastener bulb 30 and the structure 18. The pixels 169 of the fastener bulb 30 comprise fastener bulb pixels 169b (see FIG. 1), and the pixels 169 of the structure 18 comprise structure pixels 169c (see FIG. 1). As shown in FIG. 1, the fastener bulb 30 also has the fastener bulb color 170 (see also FIG. 4B), and the structure 18 has the structure color 172 (see FIG. 4B). There is also the color contrast 168 between the fastener bulb color 170 and the structure color 172. The edge detection process 166 is further configured to generate, and generates, for each of the first image 132 and the second image 136, at least the plurality of points 174, such as the plurality of edge detection points 174a (see FIGS. 1, 4B, 5A-5B), at the edge 175 (see FIGS. 1, 4B, 4C, 5A-5B) of the fastener bulb 30 between the fastener bulb 30 and the structure 18, such as the aircraft structure 52.

The ellipse fitting process 176 is configured to use, and uses, the threshold parameter 178 (see FIG. 1) to fit the ellipse 180 (see FIGS. 1, 4C, 5A-5B) around selected edge detection points 174b (see FIGS. 1, 4C, 5A-5B) of the plurality of edge detection points 174a in both the first image 132 (see FIG. 5A) and the second image 136 (see FIG. 5B), to obtain the first image ellipse fitting 182 (see FIGS. 1, 5A) and the second image ellipse fitting 184 (see FIGS. 1, 5B).

Figure 5C:
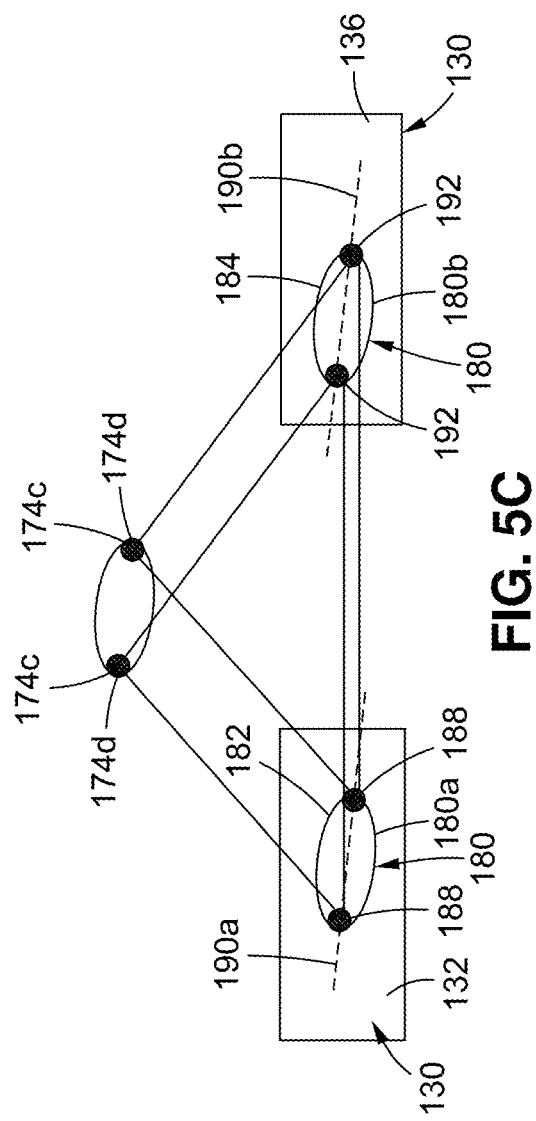
FIG. 5C is a schematic illustration of a first image ellipse, a second image ellipse, and triangulated points.
Figure 5D:
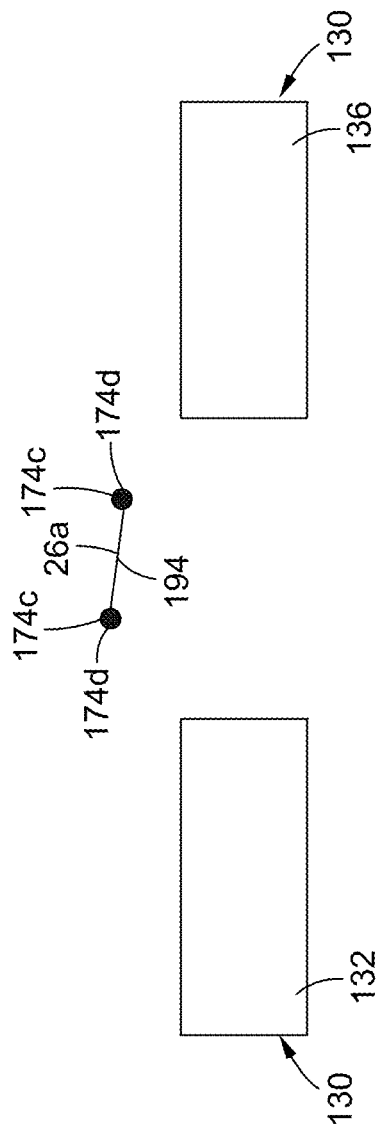
FIG. 5D is a schematic illustration of the first image, the second image, and a distance between the triangulated points of FIG. 5C.

The stereo vision process 186 is configured to triangulate, and triangulates, the first image major axis outer points 188 (see FIGS. 5A, 5C) of the major axis 190a (see FIG. 5C) of the ellipse 180 (see FIGS. 5A, 5C), such as the first image ellipse 180a (see FIGS. 5A, 5C), of the first image ellipse fitting 182 (see FIGS. 5A, 5C), and is configured to triangulate, and triangulates, the second image major axis outer points 192 (see FIG. 5C) of the major axis 190b (see FIG. 5C) of the ellipse 180 (see FIGS. 5B, 5C), such as the second image ellipse 180b (see FIGS. 5B, 5C), of the second image ellipse fitting 184, to obtain the triangulated points 174c (see FIGS. 1, 5C, 5D), such as two (2) triangulated points 174c, and such as the three-dimensional (3D) triangulated points 174d (see FIGS. 5C, 5D). The stereo vision process 186 is further configured to calculate, and calculates, the distance 194 (see FIGS. 1, 5D) between the two triangulated points 174c (see FIG. 5D), such as the three-dimensional (3D) triangulated points 174d (see FIG. 5D), to determine the bulb diameter measurement 26a (see FIGS. 1, 2C, 3B, 3C) of the bulb diameter 15 (see FIGS. 1, 2C, 3B, 3C) of the installed one-sided fastener 16a (see FIGS. 1, 2C, 3B, 3C). In another version the major axis 190a of the first image ellipse 180a of the first image 132 is projected onto the second image ellipse 180b of the second image 136, to detect the second image major axis outer points 192 of the second image ellipse 180b that correspond to the first image major axis outer points 188 of the first image ellipse 180a.

Now referring to FIG. 2A, FIG. 2A is an illustration of a partial sectional side view of an exemplary one-sided fastener 16 that may be used in a version of the system 10 (see FIG. 1) and the method 270 (see FIG. 7) of the disclosure. As shown in FIG. 2A, the one-sided fastener 16 comprises a bolt 16b having the first end 20, or head end 20a with a head portion 21, the second end 22, or tail end 22a, and the fastener body 24, such as the shaft body 24a. FIG. 2A further shows a sleeve 196, a threaded portion 198, and a nut 200. The one-sided fastener 16 may further comprise a rivet 16c (see FIG. 1) or another suitable type of one-sided fastener.

Now referring to FIG. 2B, FIG. 2B is an illustration of a cross-sectional side view of an installed one-sided fastener 16a formed from the one-sided fastener 16 of FIG. 2A, where the installed one-sided fastener 16a is installed in a structure 18. As discussed above, and as shown in FIG. 1, the structure 18 may comprise a primary structure 18a, a workpiece 44, or a coupon 46 of a vehicle 48, such as an aircraft 50, for example, an aircraft structure 52 or an aircraft part 54, or part of another vehicle 48, such as a spacecraft structure 56 of a spacecraft, a rotorcraft structure 58 of a rotorcraft, a watercraft structure 60 of a watercraft, an automobile structure 62 of an automobile, a train structure 64 of a train, or another suitable vehicle structure, or an architectural structure 66 or other suitable structure.

As shown in FIG. 2B, the installed one-sided fastener 16a, such as the bolt 16b, is installed in the structure 18 comprising the structure body 35 having two structure portions 18b that form a joined structure 18c, so that the one-sided fastener 16 of FIG. 2A is now in the form of the installed one-sided fastener 16a. As shown in FIG. 2B, the structure 18 further has the exterior surface 36 and the interior surface 38. As further shown in FIG. 2B, the installed one-sided fastener 16a is installed in the hole 40, such as the through hole 40a, formed through the structure 18, so that the hole 40 comprises the filled hole 40c. As further shown in FIG. 2B, the installed one-sided fastener 16a, such as the bolt 16b, has the first end 20 comprising a break-off end 20b, where the head portion 21 (see FIG. 2A) of the head end 20a (see FIG. 2A) has been broken off at the first side 32, such as the front side 32a, of the structure 18, with the installation process. FIG. 2B further shows the installed one-sided fastener 16a with the second end 22, or tail end 22a, the fastener body 24, such as the shaft body 24a, and the threaded portion 198. As shown in FIG. 2B, the fastener body 24, or a portion of the fastener body 24, and the second end 22 of the installed one-sided fastener 16a protrudes, or extends, from the second side 34, such as the back side 34a, of the structure 18, when installed in the structure 18.

FIG. 2B further shows the sleeve 196 now compressed against the second side 34, or back side 34a, of the structure 18. As shown in FIG. 2B, with installation of the one-sided fastener 16 through the structure 18, the sleeve 196 has a first end 202a that compresses and forms the fastener bulb 30 adjacent the second side 34, such as the back side 34a, of the structure 18, and the sleeve 196 has a second end 202b adjacent the nut 200. As shown in FIG. 2B, the fastener bulb 30 has a bulb diameter 15, and the sleeve 196 with the fastener bulb 30 has a bell-shaped profile 204. FIG. 2B further shows the threaded portion 198.

Now referring to FIG. 2C, FIG. 2C is an illustration of a perspective side view of three exemplary installed one-sided fasteners 16a installed in, and through, a structure 18, with the structure body 35 having two structure portions 18b. As discussed above, and as shown in FIG. 1, the structure 18 may comprise a primary structure 18a, a workpiece 44, or a coupon 46 of a vehicle 48, such as an aircraft 50, for example, an aircraft structure 52 or an aircraft part 54, or part of another vehicle 48, such as a spacecraft structure 56 of a spacecraft, a rotorcraft structure 58 of a rotorcraft, a watercraft structure 60 of a watercraft, an automobile structure 62 of an automobile, a train structure 64 of a train, or another suitable vehicle structure, or an architectural structure 66 or other suitable structure.

FIG. 2C shows the first side 32, or front side 32a, and the second side 34, or back side 34a, of the structure 18. FIG. 2C further shows the exterior surface 36 and the interior surface 38 of the structure 18. FIG. 2C further shows the installed one-sided fasteners 16a with the fastener body 24 and the second end 22, or tail end 22a, of the installed one-sided fasteners 16a protruding from the second side 34 of the structure 18.

As shown in FIG. 2C, the structure 18 has holes 40, such as through holes 40a, that are drilled, or formed, through the structure 18. The holes 40 include open holes 40b (see FIG. 2C) where there are no installed one-sided fasteners 16a installed through the holes 40, and the holes include filled holes 40c (see FIG. 2C) where the installed one-sided fasteners 16a are installed through the holes 40.

FIG. 2C shows two of the installed one-sided fasteners 16a each with the fastener bulb 30 properly formed by the sleeve 196 compressed against the second side 34, such as the back side 34a, of the structure 18 and each with the threaded portion 198 at the second end 22. As shown in FIG. 2C, each of the fastener bulbs 30 properly formed on the two installed one-sided fasteners 16a has a bulb diameter 15. FIG. 2C further shows one installed one-sided fastener 16a shown in the middle, where the sleeve 196 did not properly compress to form the fastener bulb 30 and the fastener bulb 30 did not properly form, and the threaded portion 198 did not extend past the sleeve 196. As shown in FIG. 2C, the installed one-sided fastener 16a in the middle with the fastener bulb 30 not properly formed has a bulb diameter 15 with a length 28 (see FIG. 1) that is less than the lengths 28 of the bulb diameters 15 of the two fastener bulbs 30 that are properly formed.

The system 10 (see FIG. 1) and the method 270 (see FIG. 7) disclosed herein are designed to measure the bulb diameter 15 (see FIGS. 1, 2C) of the fastener bulb 30 of the installed one-sided fasteners 16a, to obtain any inconsistencies of the measurement 26, such as the bulb diameter measurement 26a, of the installed one-sided fastener 16a, such as shown in FIG. 2C, where the fastener bulb 30 does not form properly. The bulb diameter measurement 26a (see FIG. 1) can be compared to the predetermined bulb diameter measurement 26b (see FIG. 1), to either accept the bulb diameter 15 and the fastener bulb 30 of the installed one-sided fastener 16a, if the bulb diameter measurement 26a is greater than, or equal to, the predetermined bulb diameter measurement 26b, or to reject the bulb diameter 15 and the fastener bulb 30 of the installed one-sided fastener 16a, if the bulb diameter measurement 26a is less than the predetermined bulb diameter measurement 26b.

Now referring to FIG. 3A, FIG. 3A is an illustration of a side perspective view of a version of an optical imaging system 74, as discussed above, that can be used in a version of the system 10 (see FIG. 1) of the disclosure, where the optical imaging system 74 is directed at the first side 32, such as the front side 32a, of the structure 18, such as an aircraft structure 52, having installed one-sided fasteners 16a, and the optical imaging system 74 is coupled to a mobile system 142. The installed one-sided fasteners 16a have locations 42 (see FIG. 3A) of installation in the structure 18. FIG. 3A shows the optical imaging system 74 positioned with respect to the structure 18 in one version of a measurement environment 205a.

As shown in FIG. 3A, the optical imaging system 74 comprises the probe 76 that in one version is in the form of the stack lens endoscope 78. In other versions, the probe 76 may comprise another suitable type of probe or endoscope. As shown in FIG. 3A, the probe 76 has the distal end 80, the proximal end 82, and the probe tip coupled to, or integral with, the probe rod 86 in the form of the elongated tube 98 and having the first end 96a and the second end 96b. In one version, the probe tip 84 comprises the endoscope probe tip 84a (see FIGS. 3B, 3C). The probe 76 may also have another suitable probe tip. In one version, the probe rod 86 comprises the endoscope probe rod 86*a* (see FIG. 3A), coupled to, or integral with, the endoscope probe tip 84*a*. The probe 76 may also have another suitable probe rod.

As further shown in FIG. 3A, the probe tip 84 has the light element 88 (see also FIGS. 3B, 3C), such as the light-emitting diode (LED) light element 88*a* (see FIGS. 3B, 3C), housed within the probe tip 84, and configured to illuminate the area to be imaged with the optical imaging system 74. As further shown in FIG. 3A, the probe tip 84 has the lens opening 90 (see also FIGS. 3B, 3C), such as the optical lens opening 90*a* (see FIGS. 3B, 3C), for example, the stack lens opening 90*b* (see FIG. 3B). The lens opening 90*a* may also comprise another suitable lens opening housed within the probe tip 84.

In one version, as shown in FIG. 3A, the lens opening 90 is coupled to, or positioned near to, two lenses 94, such as in the form of two optical lenses 94*a*, for example, two stack lenses 94*b*, housed within the elongated tube 98 of the probe rod 86. Although FIG. 3A shows two lenses 94, the optical imaging system 74 may have one lens 94 or more than two lenses 94 as needed. In another version, as shown in FIG. 3D, the lens opening 90, such as the optical lens opening 90*a*, is coupled to, or positioned near to, the integrated camera 127 having the camera sensor 124 and one or more lenses 94 integrated within, and housed within, an interior of the probe rod 86.

As shown in FIG. 3A, and discussed in detail above, in one version, the optical imaging system 74 further comprises the linear axis slide 100, such as the high precision linear axis slide 100*a*, also referred to as a linear motion slide or a linear motion guide, that functions as a precise and controlled actuator device to control linear motion of the probe 76. In other versions, the optical imaging system 74 includes another suitable actuator device, such as a high precision actuator device. As shown in FIG. 3A, the linear axis slide 100, such as the high precision linear axis slide 100*a*, is coupled, or attached, to the proximal end 82 of the probe 76, and in particular, is coupled, or attached, to the second end 96*b* of the probe rod 86. The linear axis slide 100, such as the high precision linear axis slide 100*a*, is configured to move, and moves, the probe 76, including the probe tip 84 and the probe rod 86, in the linear path 102, such as along a linear axis. FIG. 3A shows the probe tip 84 configured for movement in the forward direction 104 through the hole 40, such as the through hole 40*a*, for example, the open hole 40*b*.

As shown in FIG. 3A, in one exemplary version, the linear axis slide 100, such as the high precision linear axis slide 100*a*, comprises the movable carriage 108 that supports the probe 76 and has the movable carriage first portion 108*a*, or vertical block portion, coupled to the movable carriage second portion 108*b*, or base block portion, and positioned on the platform base 110. As shown in FIG. 3A, the movable carriage first portion 108*a* is coupled to the proximal end 82 of the probe 76, and in particular, is coupled to the second end 96*b* of the probe rod 86, via the coupling 115, such as the probe mount coupling 115*a*, or another suitable coupling. As further shown in FIG. 3A, in one version, the movable carriage 108 is coupled, or attached, to the guides 112 that travel linearly along the guide rails 114. FIG. 3A further shows the drive unit 116, such as the powered drive unit 116*a*, for example, the linear motor 118, that generates a force, such as a mechanical force or an electromagnetic force, to move the movable carriage 108 along the one or more guide rails 114. In one version, the movable carriage 108 is guided by bearings (not shown). The linear axis slide 100, such as the high precision linear axis slide 100*a*, may further comprise one or more additional components such as sensors, for example, position sensors, as well as limit switches, impact dampers, or other suitable components existing in the art of linear axis slide devices.

FIG. 3A further shows, in one version, the linear axis slide 100, such as the high precision linear axis slide 100*a*, coupled to the control system 120, such as the electronic control system 120*a*, having the computer system 121 with the computer 122 and the one or more computer software programs 164. The control system 120 controls a speed, a direction, and a position of the linear axis slide 100.

As shown in FIG. 3A, the optical imaging system 74 further comprises, in one version, the camera sensor 124, such as the optical image camera sensor 124*a*, housed within the camera hardware device 125. The type of camera sensor 124 that may be used is discussed in detail above. The camera hardware device 125 is coupled to the movable carriage first portion 108*a* of the movable carriage 108 and is coupled to the probe 76, via the camera attachment devices 126 (see FIG. 3A), such as a turn knob connector or adapter or other suitable camera attachment device. In one version, as shown in FIG. 3A, the camera sensor 124, such as the optical image camera sensor 124*a*, is coupled to the lenses 94 housed in the probe rod 86, which in turn, are coupled to, or positioned near to, the lens opening 90. The camera sensor 124, such as the optical image camera sensor 124*a*, is also coupled to control system 120 (see FIG. 3A), such as the electronic control system 120*a* (see FIG. 3A). As shown in FIG. 3A, in one version, the camera sensor 124 is positioned external to the probe 76 and the probe rod 86. In another version, as shown in FIG. 3D, the camera sensor 124 is coupled to, or integrated within, the probe rod 86 of the probe 76, as part of the integrated camera 127. In other versions, the camera sensor 124 may be positioned in another configuration external to the probe 76.

The optical imaging system 74 may be supported on various support structures and positioned with respect to the structure 18 with the one or more installed one-sided fasteners 16*a* in various ways. As shown in FIG. 3A, in one version, the optical imaging system 74 is attached, or coupled, to the mobile system 142 having the movable base 144 configured to move along the track assembly 145 comprising the rails 146 and the track 148. In another version, the mobile system 142 may comprise another suitable movable assembly. In particular, as shown in FIG. 3A, the optical imaging system 74 is attached, or coupled, to the movable base 144 of the mobile system 142. In other versions, the optical imaging system 74 may be coupled to the robotic system 150 (see FIG. 3D), or coupled to, or positioned on, a stationary support structure, such as a table, a platform, a mounting plate, or other suitable stationary support structures.

Now referring to FIG. 3B, FIG. 3B is an illustration of an enlarged side perspective view of the probe tip 84, such as the endoscope probe tip 84*a*, of the probe 76 of the optical imaging system 74 of FIG. 3A, positioned at a first position 134 in proximity to an installed one-sided fastener 16*a* protruding from the second side 34, such as the back side 34*a*, of the structure 18, such as the aircraft structure 52. FIG. 3B shows the probe tip 84 of the optical imaging system 74 positioned at the first position 134 with respect to the installed one-sided fastener 16*a* and the structure 18, such as the aircraft structure 52, in the measurement environment 205*a*. FIG. 3B shows the installed one-sided fastener 16a with the fastener bulb 30 formed against the back side 34a and shows the bulb diameter 15 of the fastener bulb 30.

FIG. 3B further shows the lens opening 90, such as the optical lens opening 90a, for example, the stack lens opening 90b, positioned in proximity to, or next to, the light element 88, such as the light-emitting diode (LED) light element 88a. The lens opening 90 and the light element 88 are housed within the probe tip 84 and face outwardly out the window 92 (see FIG. 3B) that is cut out, or formed, in the probe tip 84. FIG. 3B shows the probe tip 84 of the probe 76 inserted through the hole 40, such as the through hole 40a, for example, the open hole 40b, formed in the structure 18.

As shown in FIG. 3B, the lens opening 90 has a field of view 206 that includes the area of interest of the installed one-sided fastener 16a comprising the fastener bulb 30 against the back side 34a of the structure 18. The first position 134 is the position of the lens opening 90, and in particular, the position of a center point 208 of the lens opening 90, when the first image 132 of the fastener bulb 30 against the back side 34a of the structure 18 is taken with the optical imaging system 74. The installed one-sided fastener 16a does not have to be centered in the image 130 or the field of view 206, as long as the image 130 includes at least the fastener bulb 30 against the back side 34a of the structure 18. Image data 128 (see FIGS. 1, 4A, 5A-5B), taken and generated with the optical imaging system 74, comprises at least the first image 132 (see FIGS. 4A, 5A) of the fastener bulb 30 against the back side 34a of the structure 18 taken from the first position 134 positioned beyond the back side 34a of the structure 18. In one version, multiple images 130 (see FIG. 1), such as three (3) to five (5), or more, images 130 may be taken of the first image 132 at the first position 134 and processed.

Now referring to FIG. 3C, FIG. 3C is an illustration of an enlarged side perspective view of the probe tip 84, such as the endoscope probe tip 84a, of the probe 76 of the optical imaging system 74 of FIGS. 3A-3B, where the probe tip 84 is moved to, and positioned at, a second position 138 in proximity to the installed one-sided fastener 16a of FIG. 3B, protruding from the second side 34, such as the back side 34a, of the structure 18, such as the aircraft structure 52. FIG. 3C shows the probe tip 84 of the optical imaging system 74 positioned at the second position 138 with respect to the first position 134 and with respect to the installed one-sided fastener 16a and the structure 18, such as the aircraft structure 52, in the measurement environment 205a. FIG. 3C shows the installed one-sided fastener 16a with the fastener bulb 30 formed against the back side 34a and shows the bulb diameter 15 of the fastener bulb 30.

FIG. 3C further shows the lens opening 90, such as the optical lens opening 90a, positioned in proximity to, or next to, the light element 88, such as the light-emitting diode (LED) light element 88a. The lens opening 90 and the light element 88 are housed within the probe tip 84 and face outwardly out the window 92 (see FIG. 3C) cut out or formed in the probe tip 84. FIG. 3C shows the probe tip 84 of the probe 76 inserted farther through the open hole 40b formed in the structure 18, and shows a portion 86b of the probe rod 86 inserted through the open hole 40b. FIG. 3C further shows the predetermined distance 140, or known distance, between the first position 134 and the second position 138.

As shown in FIG. 3C, the lens opening 90 has the field of view 206 that includes the area of interest of the installed one-sided fastener 16a comprising the fastener bulb 30 against the back side 34a of the structure 18. The second position 138 is the position of the lens opening 90, and in particular, the position of the center point 208 of the lens opening 90, and the position that is the predetermined distance 140 from the first position 134, and when the second image 136 of the fastener bulb 30 against the back side 34a of the structure 18 is taken with the optical imaging system 74. Image data 128 (see FIGS. 1, 5B), taken and generated with the optical imaging system 74, comprises at least the second image 136 (see FIG. 5A) of the fastener bulb 30 against the back side 34a of the structure 18 taken from the second position 138 positioned beyond the back side 34a of the structure 18. In one version, multiple images 130 (see FIG. 1), such as three (3) to five (5), or more, images 130 may be taken of the second image 136 at the second position 138 and processed.

Now referring to FIG. 3D, FIG. 3D is an illustration of a side perspective view of another version of the optical imaging system 74 that can be used in a version of a system 10 of the disclosure, where the optical imaging system 74 is coupled, or attached, to a robotic system 150, and the optical imaging system 74 is directed at the first side 32, such as the front side 32a, of a structure 18, such as a workpiece 44, having installed one-sided fasteners 16a. FIG. 3D shows the optical imaging system 74 coupled, or attached, to the robotic system 150 and positioned with respect to the structure 18 in a measurement environment 205b.

As shown in FIG. 3D, the optical imaging system 74 is coupled, or attached, to the end 152 of the robot arm 154, via the support mount 158. As shown in FIG. 3D, the optical imaging system 74 acts as an end effector 156 of the robotic system 150. As shown in FIG. 3D, the robotic system 150 further comprises an elbow joint 210 connected to the robot arm 154, a shoulder 212 connected to the elbow joint 210, a base 214 connected to the shoulder 212, and a power supply 162 connected to the shoulder 212, for powering the robotic system 150. The robotic system 150 provides customized motion of the optical imaging system 74 with respect to the structure 18 and the installed one-sided fasteners 16a.

FIG. 3D shows a version of the optical imaging system 74 comprising the probe 76 with the probe tip 84 having the lens opening 90 and the light element 88, and with the probe rod 86 having the integrated camera 127. As shown in FIG. 3D, the integrated camera 127 has the camera sensor 124 and the lenses 94 integrated within, and housed within, an interior of the probe rod 86. The lens opening 90 is coupled to, or positioned near to, the integrated camera 127. Alternatively, the optical imaging system 74 shown in FIG. 3D may comprise the camera sensor 124 external to the probe 76 and external to the probe rod 86, such as shown in FIG. 3A.

FIG. 3D shows the probe tip 84 being inserted from the first side 32, such as the front side 32a, into an open hole 40b formed through the structure 18, to obtain images 130 (see FIG. 1) of an installed one-sided fastener 16a installed in the structure 18 in a hole 40, such as a through hole 40a, for example, a filled hole 40c. As shown in FIG. 3D, the installed one-sided fastener 16a is in proximity to, or adjacent to, the open hole 40b, through which the probe tip 84 is inserted through. FIG. 3D further shows the second side 34, such as the back side 34a, of the structure 18.

Figure 4B:
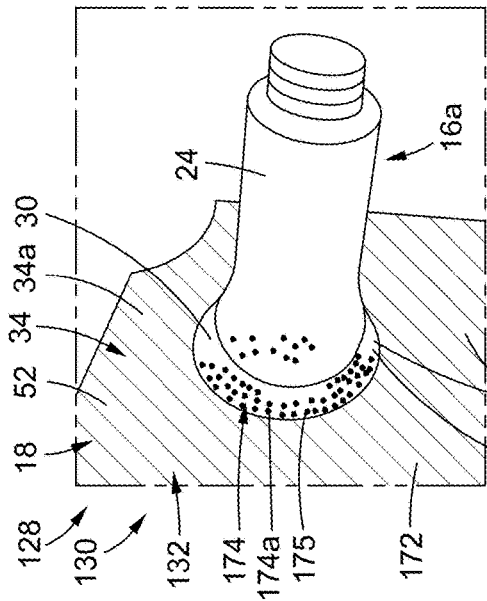
FIG. 4B is an illustration of a side perspective view of the first image of the installed one-sided fastener and structure of FIG. 4A, showing edge detection points.
Figure 4A:
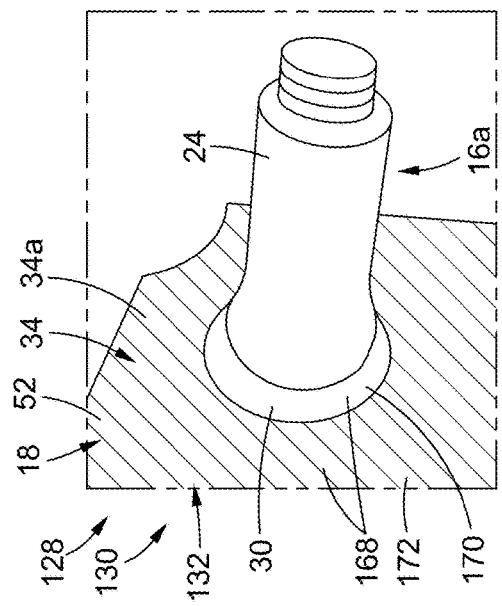
FIG. 4A is an illustration of a side perspective view of a first image of an installed one-sided fastener installed in a structure.
Figure 4C:
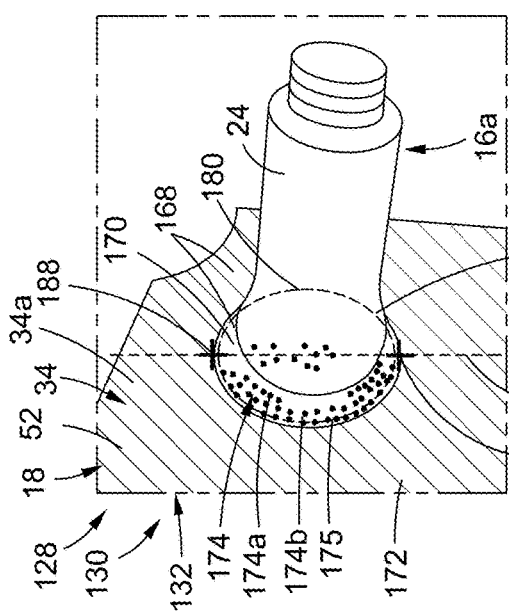
FIG. 4C is an illustration of a side perspective view of the first image with the edge detection points of FIG. 4B, showing an ellipse fitted around an edge of a fastener bulb.

Now referring to FIGS. 4A-4C, FIGS. 4A-4C show image data 128 comprising an image 130, such as a first image 132, of the fastener bulb 30 positioned against the second side 34, such as the back side 34a of a structure 18, such as an aircraft structure 52, taken from a first position 134 (see FIGS. 1, 3B) positioned beyond the back side 34a of the structure 18. FIGS. 4A-4C further show the image 130, such as the first image 132, of the fastener body 24 of the installed one-sided fastener 16a protruding from the back side 34a of the structure 18. The image data 128 comprising the image 130, such as the first image 132, is taken, captured, and generated with a version of the optical imaging system 74 (see FIGS. 1, 3A, 3D). The same edge detection process 166 and ellipse fitting process 176 can be used for the second image 136 taken from the second position 138 (see FIGS. 1, 3C).

FIG. 4A is an illustration of a side perspective view of the image 130, such as the first image 132, of the installed one-sided fastener 16a installed in the structure 18, such as the aircraft structure 52. Alternatively, as shown in FIG. 1, the structure 18 may also comprise a workpiece 44, a coupon 46, a spacecraft structure 56 of a spacecraft, a rotorcraft structure 58 of a rotorcraft, a watercraft structure 60 of a watercraft, an automobile structure 62 of an automobile, a train structure 64 of a train, or another suitable vehicle structure, or may comprise an architectural structure 66.

FIG. 4A further shows the fastener bulb color 170 and the structure color 172, where the fastener bulb color 170 is a different color than the structure color 172. There is a color contrast 168 (see FIG. 4A) between the pixels 169 (see FIG. 1), such as adjacent pixels 169a (see FIG. 1), of the fastener bulb 30 and of the structure 18 in the image 130, such as the first image 132.

FIG. 4B is an illustration of a side perspective view of the image 130, such as the first image 132, of the installed one-sided fastener 16a and the structure 18 of FIG. 4A, showing points 174, such as edge detection points 174a, generated by the edge detection process 166 (see FIG. 1) of the post image processing system 160 (see FIG. 1). The edge detection process 166, or edge detection algorithm, is executed by a computer software program 164 (see FIGS. 1, 3A, 6) on a computer 122 (see FIGS. 1, 3A, 6) of the computer system 121 (see FIGS. 1, 3A, 6). As shown in FIG. 4B, the edge detection process 166 detects for the first image 132 the color contrast 168 between the pixels 169 (see FIG. 1), such as the adjacent pixels 169a (see FIG. 1), of the fastener bulb 30 and the structure 18. The pixels 169 of the fastener bulb 30 comprise fastener bulb pixels 169b (see FIG. 1), and the pixels 169 of the structure 18 comprise structure pixels 169c (see FIG. 1). As shown in FIG. 4B, the fastener bulb 30 has the fastener bulb color 170, and the structure 18 has the structure color 172, where the fastener bulb color 170 is different from the structure color 172, and there is also the color contrast 168 between the fastener bulb color 170 and the structure color 172.

As further shown in FIG. 4B, the edge detection process 166 generates for the first image 132 the plurality of points 174, such as the plurality of edge detection points 174a, at the edge 175 of the fastener bulb 30 between the fastener bulb 30 and the structure 18. The edge detection process 166, such as an edge detection algorithm, gathers or generates the points 174, such as the edge detection points 174a, within the fastener interest area, such as the fastener bulb 30, using the color contrast 168 between the adjacent pixels 169a (see FIG. 1), of the fastener bulb 30 and the structure 18.

FIG. 4C is an illustration of a side perspective view of the image 130, such as the first image 132, with the edge detection points 174a of FIG. 4B, showing an ellipse 180 fitted around an edge 175 of the fastener bulb 30 of the installed one-sided fastener 16a, where the ellipse 180 is fitted using the ellipse fitting process 176 (see FIG. 1) of the post image processing system 160 (see FIG. 1). The ellipse fitting process 176, or ellipse fitting algorithm, is executed by a computer software program 164 (see FIGS. 1, 3A, 6) on a computer 122 (see FIGS. 1, 3A, 6) of the computer system 121 (see FIGS. 1, 3A, 6).

As shown in FIG. 4C, the ellipse fitting process 176 uses a threshold parameter 178 to fit an ellipse 180 around selected edge detection points 174b of the points 174, such as the plurality of edge detection points 174a, in the first image 132, to obtain a first image ellipse fitting 182. In one version, the threshold parameter 178 comprises a predetermined number of selected edge detection points 174b of the edge detection points 174a that define a line representing the ellipse 180 that is fit around the fastener bulb 30. FIG. 4C further shows first image major axis outer points 188 of a major axis 190a of the ellipse 180. The first image major axis outer points 188 are the outermost or widest most points along the major axis 190a of the ellipse 180.

Now referring to FIGS. 5A-5B, FIG. 5A is an illustration of a side perspective view of an image 130, such as a first image 132, of an installed one-sided fastener 16a installed in a structure 18, such as an aircraft structure 52, showing an ellipse 180, such as a first image ellipse 180a fitted around an edge 175 of a fastener bulb 30 of the installed one-sided fastener 16a, and showing first image major axis outer points 188 of a major axis 190a of the ellipse 180, such as a first image ellipse 180a. FIG. 5B is an illustration of a side perspective view of an image 130, such as a second image 136 of an installed one-sided fastener 16a installed in a structure 18, such as an aircraft structure 52, showing an ellipse 180, such as a second image ellipse 180b, fitted around an edge 175 of a fastener bulb 30 of the installed one-sided fastener 16a, and showing second image major axis outer points 192 of a major axis 190b of the ellipse 180, such as the second image ellipse 180b.

FIGS. 5A-5B show image data 128 comprising the images 130, such as the first image 132 (see FIG. 5A) taken from a first position 134 (see FIGS. 1, 3B) and the second image 136 (see FIG. 5B) taken from a second position 138 (see FIGS. 1, 3C), of the fastener bulb 30 positioned against the second side 34, such as the back side 34a of the structure 18, such as the aircraft structure 52. FIGS. 5A-5B further show the images 130, such as the first image 132 (see FIG. 5A) and the second image 136 (see FIG. 5B), of the fastener body 24 of the installed one-sided fastener 16a protruding from the back side 34a of the structure 18. The image data 128 comprising the images 130, such as the first image 132 (see FIG. 5A) and the second image 136 (see FIG. 5B), is taken, captured, and generated with a version of the optical imaging system 74 (see FIGS. 1, 3A, 3D). FIGS. 5A-5B further show the fastener bulb color 170 and the structure color 172, where the fastener bulb color 170 is a different color than the structure color 172. There is a color contrast 168 (see FIGS. 5A-5B) between the pixels 169 (see FIG. 1), such as adjacent pixels 169a (see FIG. 1), of the fastener bulb 30 and of the structure 18 in the images 130, such as the first image 132 (see FIG. 5A) and the second image 136 (see FIG. 5B).

FIGS. 5A-5B further show the points 174, such as the edge detection points 174a, generated by the edge detection process 166 (see FIG. 1) of the post image processing system 160 (see FIG. 1), and show the ellipse 180 fitted around the edge 175 of the fastener bulb 30 of the installed one-sided fastener 16a, where the ellipse 180 is fitted using the ellipse fitting process 176 (see FIG. 1) of the post image processing system 160 (see FIG. 1). FIG. 5A shows the ellipse 180, such as the first image ellipse 180a, formed around selected edge detection points 174b of the points 174, such as the plurality of edge detection points 174a, in the first image 132, to obtain the first image ellipse fitting 182. FIG. 5B shows the ellipse 180, such as the second image ellipse 180b, formed around selected edge detection points 174b of the points 174, such as the plurality of edge detection points 174a, in the second image 136, to obtain the second image ellipse fitting 184.

FIG. 5A further shows the first image major axis outer points 188 of the major axis 190a of the ellipse 180, such as the first image ellipse 180a. The first image major axis outer points 188 are the outermost or widest most points along the major axis 190a of the ellipse 180, such as the first image ellipse 180a. FIG. 5B further shows the second image major axis outer points 192 of the major axis 190b of the ellipse 180, such as the second image ellipse 180b. The second image major axis outer points 192 are the outermost or widest most points along the major axis 190b of the ellipse 180, such as the second image ellipse 180b.

Now referring to FIG. 5C, FIG. 5C, FIG. 5C is a schematic illustration of the ellipse 180, such as the first image ellipse 180a of FIG. 5A, the ellipse 180, such as the second image ellipse 180b of FIG. 5B, and the triangulated points 174c, such as three-dimensional triangulated points 174d, triangulated by the stereo vision process 186 (see FIG. 1). The stereo vision process 186, such as a stereo vision algorithm, is executed by a computer software program 164 (see FIGS. 1, 3A, 6) on a computer 122 (see FIGS. 1, 3A, 6) of the computer system 121 (see FIGS. 1, 3A, 6). The stereo vision process 186 triangulates the first image major axis outer points 188 (see FIGS. 5A, 5C) of a major axis 190a (see FIGS. 5A, 5C) of the ellipse 180 (see FIGS. 5A, 5C), such as the first image ellipse 180a (see FIGS. 5A, 5C), of the first image ellipse fitting 182 (see FIGS. 5A, 5C). The stereo vision process 186 further triangulates the second image major axis outer points 192 (see FIGS. 5B, 5C) of a major axis 190b (see FIGS. 5B, 5C) of the ellipse 180 (see FIGS. 5B, 5C), such as the second image ellipse 180b (see FIGS. 5B, 5C), of the second image ellipse fitting 184 (see FIGS. 5B, 5C), to obtain the triangulated points 174c (see FIGS. 1, 5C, 5D), such as two (2) triangulated points 174c, for example, the three-dimensional (3D) triangulated points 174d (see FIGS. 5C, 5D). The ellipses 180, such as the first image ellipse 180a and the second image ellipse 180b, are projections of circles onto the image planes so that the major axis 190a and the major axis 190b can each be equated with a diameter of a circle.

Now referring to FIG. 5D, FIG. 5D is a schematic illustration of the image 130, such as the first image 132, the image 130, such as the second image 136, and a distance 194 between the two triangulated points 174c of FIG. 5C, such as the three-dimensional (3D) triangulated points 174d of FIG. 5C, to determine the measurement 26 (see FIG. 1), such as the bulb diameter measurement 26a, of the bulb diameter 15 (see FIGS. 1, 2B) of the fastener bulb 30 (see FIGS. 5A-5B) of the installed one-sided fastener 16a (see FIGS. 5A-5B). As shown in FIG. 5D, the distance 194 determined with the stereo vision process 186 is equal to a bulb diameter measurement 26a of the bulb diameter 15 (see FIG. 1) of the fastener bulb 30 (see FIGS. 5A-5B) of the installed one-sided fastener 16a (see FIGS. 5A-5B).

Figure 6:
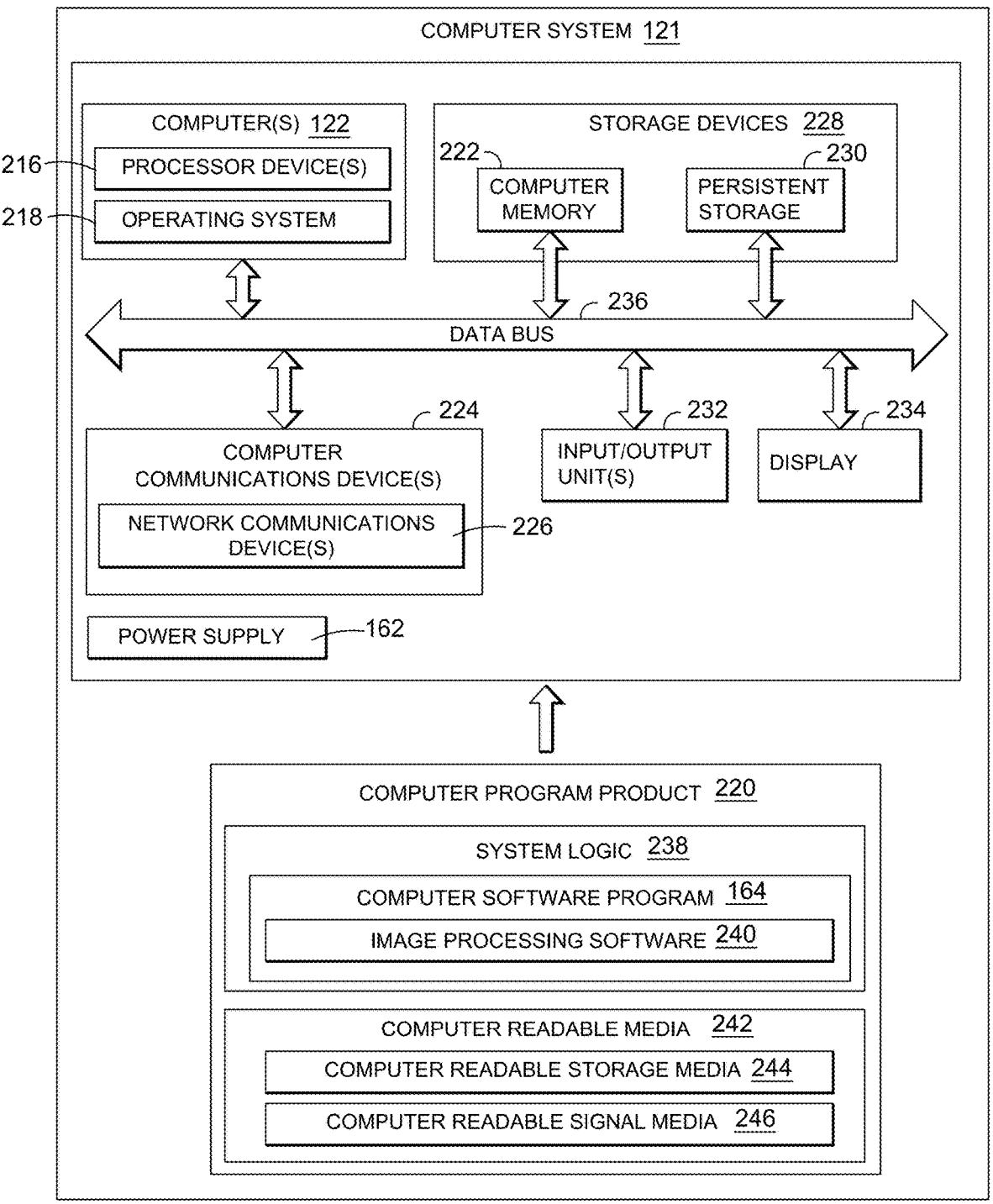
FIG. 6 is an illustration of a block diagram of an exemplary version of a computer system that may be used with versions of a system and a method of the disclosure.

Now referring to FIG. 6, FIG. 6 is an illustration of a block diagram of an exemplary version of the computer system 121 that may be used with the system 10 (see FIG. 1), and the method 270 (see FIG. 7) of the disclosure. As shown in FIG. 6, the computer system 121 comprises one or more computers 122 with one or more processor devices 216, and an operating system 218 188. The computer system 121 (see FIG. 6) may be used to implement the one or more computers 122 (see FIG. 6).

The one or more computers 122 (see FIG. 6) or one or more processor devices 216 (see FIG. 6) may be configured to control one or more functions of one or more elements of the system 10 (see FIG. 1) through computer program instructions, such as a computer program product 220 (see FIG. 6) stored on a computer memory 222 (see FIG. 6), accessible to the one or more computers 122 (see FIG. 6), or one or more processor devices 216 (see FIG. 6).

As shown in FIG. 6, the computer system 121 may further comprise one or more computer communications devices 224, such as network communications devices 226, for linking the system 10 (see FIG. 1), for example, to one or more separate systems. The network communications devices 226 (see FIG. 6) may comprise network links between various computers and devices connected together within a network data processing system via wire connections, wireless communication links, fiber optic cables, or other suitable network connections, and that may connect to a network, a server, the Internet, or another system or device.

The one or more computer communications devices 224 (see FIG. 6) may be configured to provide for communications in accordance with any of a number of wired or wireless communication standards. The one or more computers 122 (see FIG. 6) or one or more processor devices 216 (see FIG. 6) may also be configured to facilitate communications via the one or more computer communications devices 224 (see FIG. 6) by, for example, controlling hardware included within the one or more computer communications devices 224 (see FIG. 6). The one or more computer communications devices 224 (see FIG. 6) may include, for example, one or more antennas, a transmitter, a receiver, a transceiver and/or supporting hardware, including, for example, a processor for enabling communications.

As shown in FIG. 6, the computer system 121 further comprises storage devices 228, such as computer memory 222 and persistent storage 230. The computer memory 222 (see FIG. 6) may comprise one or more of a random access memory (RAM), including dynamic and/or static RAM, on-chip or off-chip cache memory, or other suitable computer memory. The persistent storage 230 (see FIG. 6) may comprise one or more of a flash memory, a hard drive, Read-Only Memory (ROM), magnetic storage devices such as hard disks, floppy disk drives, and rewritable magnetic tape, rewritable optical disk drives and/or media, non-volatile random access memory (NVRAM), or other suitable persistent storage.

As shown in FIG. 6, the computer system 121 further comprises one or more input/output units 232, a display 234, a data bus 236, and a power supply 162. The one or more input/output units 232 (see FIG. 6) provide for the input and output of data with other devices connected to the computer system 121 (see FIG. 6), such as, the computer interfaces. The one or more input/output units 232 (see FIG. 6) may comprise such devices as a keyboard, a mouse, a joystick, or other input/output devices. For example, the one or more input/output units 232 (see FIG. 6) may provide a connection for user input though a keyboard and mouse, or may send output to a printer or other device.

The display 234 (see FIG. 6) provides the means to display the image data 128 (see FIG. 1), or other data or information to a user, an analyst, one or more separate automated systems, automated computer programs, automated apparatuses, or automated devices, or another suitable separate system, program, or device. As shown in FIG. 6, the data bus 236 provides communications between the one or more computers 122, the computer memory 222, the persistent storage 230, the computer communications devices 224, the one or more input/output units 232, and the display 234. The power supply 162 (see FIG. 6) of the computer system 121 (see FIG. 6) may comprise batteries, electricity, solar chargers, or other power supply elements.

As shown in FIG. 6, the computer program product 220 is preferably used in the computer system 121. The computer program product 220 (see FIG. 6) comprises a system logic 238 (see FIG. 6). As shown in FIG. 6, the system logic 238 may comprise one or more computer software programs 164, such as image processing software 240, for example, for the edge detection process 166 (see FIG. 1), the ellipse fitting process 176 (see FIG. 1), and the stereo vision process 186 (see FIG. 1). The system logic 238 may further comprise an algorithm, program code, computer firmware, or another suitable system logic. As shown in FIG. 6, the computer program product 220 may comprise a computer readable media 242. The computer readable media 242 (see FIG. 6) may comprise computer readable storage media 244 (see FIG. 6), computer readable signal media 246 (see FIG. 6), or another suitable computer readable media.

The system logic 238 (see FIG. 6) may be stored in and retrieved from the computer readable storage media 244 (see FIG. 6) and loaded into the one or more computers 122 (see FIG. 6), the one or more processor devices 216, or other programmable device, to configure and direct the one or more computers 122, the one or more processor devices 216, or other programmable device to execute operations to be performed on or by the one or more computers 122, the one or more processor devices 216, or other programmable device, and to function in a particular way. Execution of the system logic 238 (see FIG. 6) may produce a computer-implemented system, process or method, such that the system logic 238 executed by the one or more computers 122 (see FIG. 6), one or more processor devices 216 (see FIG. 6), or other programmable device provide operations for implementing the functions disclosed herein.

Figure 7:
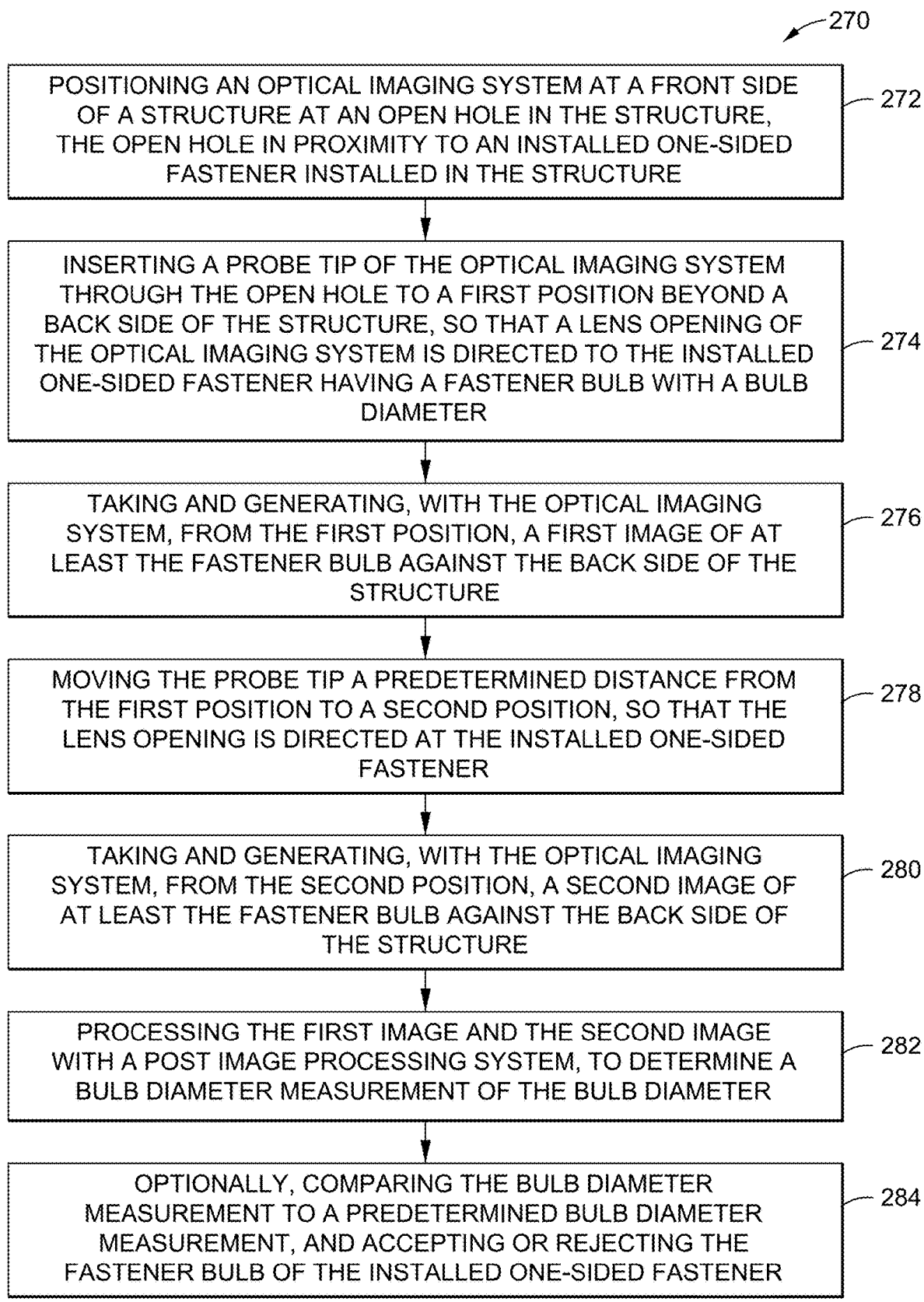
FIG. 7 is an illustration of a flow diagram of an exemplary version of a method of the disclosure.

Now referring to FIG. 7, FIG. 7 is an illustration of a flow diagram of an exemplary version of a method 270 of the disclosure. In another version of the disclosure, there is provided the method 270 for measuring 12 (see FIG. 1) a bulb diameter 15 (see FIGS. 1, 2B) of an installed one-sided fastener 16*a* (see FIGS. 1, 2B) installed in a structure 18 (see FIGS. 1, 2B). The blocks in FIG. 7 represent operations and/or portions thereof, or elements, and lines connecting the various blocks do not imply any particular order or dependency of the operations or portions thereof, or elements. FIG. 7 and the disclosure of the steps of the method 270 set forth herein should not be interpreted as necessarily determining a sequence in which the steps are to be performed. Rather, although one illustrative order is indicated, it is to be understood that the sequence of the steps may be modified when appropriate. Accordingly, certain operations may be performed in a different order or simultaneously.

As shown in FIG. 7, the method 270 comprises the step of positioning 272 an optical imaging system 74 (see FIGS. 1, 3A) at a front side 32*a* (see FIG. 3A) of the structure 18 (see FIG. 3A) directed at an open hole 40*b* (see FIG. 3A) in the structure 18. The open hole 40*b* is in proximity to the installed one-sided fastener 16*a* (see FIG. 3A) installed in the structure 18.

The optical imaging system 74, as discussed in detail above, comprises the probe 76 (see FIG. 3A) having the probe tip 84 (see FIGS. 3A-3B) coupled to the probe rod 86 (see FIG. 3A). The probe tip 84 has the light element 88 (see FIGS. 3A-3C), such as the light-emitting diode (LED) light element 88*a* (see FIGS. 3A-3C), and has the lens opening 90 (see FIGS. 3A-3C), such as the optical lens opening 90*a* (see FIGS. 3A-3C), for example, the stack lens opening 90*b* (see FIG. 3A), or another suitable lens opening, housed within the probe tip 84. positioned near, or adjacent to, the light element 88.

As shown in FIGS. 3B, 3C, in one version, the lens opening 90 is positioned in proximity to, or next to, the light element 88, within the probe tip 84 interior and the lens opening 90 and the light element 88 face out the window 92 of the probe tip 84. In another version, the lens opening 90 and the light element 88 may be positioned in a different configuration. In one version, as shown in FIG. 3A, the lens opening 90, such as the optical lens opening 90*a*, for example, the stack lens opening 90*b*, is coupled, or attached, to one or more lenses 94 (see also FIG. 1), such as one or more optical lenses 94*a* (see also FIG. 1), for example, one or more stack lenses 94*b* (see also FIG. 1), housed within the probe rod 86 (see FIG. 3A). In another version, as shown in FIG. 3D, the lens opening 90, such as the optical lens opening 90*a*, is coupled, or attached, to the integrated camera 127 (see FIG. 3D) having the camera sensor 124 (see also FIG. 1) and one or more lenses 94 integrated within, and housed within, an interior of the probe rod 86. In various versions, the camera sensor 124 of the optical imaging system 74 may be coupled to, or integrated within, the probe rod 86 (see FIG. 3D), or the camera sensor 124 may be coupled external to the probe rod 86, via one or more added structures, for example, one or more couplings 115 (see FIG. 3A), or the camera sensor 124 may be positioned in another configuration external to the probe 76. The optical imaging system 74 further comprises the linear axis slide 100 (see FIG. 3A) coupled to the probe rod 86. The linear axis slide 100 is discussed in detail above with respect to FIG. 3A.

The step of positioning 272 the optical imaging system 74 may further comprise, positioning the optical imaging system 74 attached to one of, a movable base 144 (see FIG. 3A) of a mobile system 142 (see FIG. 3A), or an end 152 (see FIG. 3D) of a robot arm 154 (see FIG. 3D) of a robotic system 150 (see FIG. 3D), or another suitable support platform.

As shown in FIG. 7, the method 270 further comprises the step of inserting 274 the probe tip 84 through the open hole 40*b* to the first position 134 (see FIG. 3B) positioned beyond the back side 34*a* (see FIG. 3B) of the structure 18, so that the lens opening 90 (see FIG. 3B) is directed at the installed one-sided fastener 16*a* (see FIG. 3B). As shown in FIGS. 3B-3C, the installed one-sided fastener 16*a* has the fastener body 24 protruding from the back side 34*a* of the structure 18, and the fastener body 24 has the fastener bulb 30 with the bulb diameter 15.

As shown in FIG. 7, the method 270 further comprises the step of taking and generating 276, with the optical imaging system 74, from the first position 134, the first image 132 (see FIGS. 1, 5A) of at least the fastener bulb 30 (see FIG. 3B) against the back side 34*a* (see FIG. 3B) of the structure 18.

As shown in FIG. 7, the method 270 further comprises the step of moving 278 the probe tip 84 the predetermined distance 140 (see FIG. 3C) from the first position 134 (see FIG. 3C) to the second position 138 (see FIG. 3C) positioned beyond the back side 34*a* of the structure 18, so that the lens opening 90 (see FIG. 3C) is directed at the installed one-sided fastener 16*a* (see FIG. 3C).

As shown in FIG. 7, the method 270 further comprises the step of taking and generating 280, with the optical imaging system 74 from the second position 138 (see FIG. 3C), a second image 136 (see FIGS. 1, 3C) of at least the fastener bulb 30 (see FIG. 3C) against the back side 34*a* (see FIG. 3C) of the structure 18 (see FIG. 3C).

As shown in FIG. 7, the method 270 further comprises the step of processing 282 the first image 132 and the second image 136 with the post image processing system 160 (see FIG. 1), discussed in detail above, to determine the bulb diameter measurement 26*a* (see FIG. 1) of the bulb diameter 15 (see FIGS. 1, 3B-3C) of the fastener bulb 30 (see FIGS. 3B-3C) of the installed one-sided fastener 16*a* (see FIGS. 3B-3C). As shown in FIG. 1, the post image processing system 160 comprises the edge detection process 166 (see FIG. 1), the ellipse fitting process 176 (see FIG. 1), and the stereo vision process 186 (see FIG. 1).

The step of processing 282 the first image 132 and the second image 136 with the post image processing system 160 further comprises, using the edge detection process 166 (see FIG. 1) to detect the color contrast 168 (see FIG. 1) between the adjacent pixels 169*a* (see FIG. 1) of the fastener bulb 30 and the structure 18. The pixels 169 of the fastener bulb 30 comprise fastener bulb pixels 169*b* (see FIG. 1), and the pixels 169 of the structure 18 comprise structure pixels 169*c* (see FIG. 1). As shown in FIG. 1, the fastener bulb 30 also has the fastener bulb color 170, and the structure 18 has the structure color 172, and there is also the color contrast 168 between the fastener bulb color 170 and the structure color 172.

The edge detection process 166 further generates for each of the first image 132 and the second image 136, at least the plurality of points 174 (see FIGS. 1, 4B, 5A-5B), such as the plurality of edge detection points 174*a* (see FIGS. 1, 4B, 5A-5B), at the edge 175 (see FIGS. 1, 4B, 5A-5B) of the fastener bulb 30 between the fastener bulb 30 and the structure 18. The edge detection process 166, such as an edge detection algorithm, gathers or generates points 174, such as the edge detection points 174*a*, within the fastener interest area, such as the fastener bulb 30, using the color contrast 168 (see FIG. 1) between the adjacent pixels 169*a* (see FIG. 1), of the fastener bulb 30 and the structure 18, including the color contrast 168 between the structure color 172 and the fastener bulb color 170.

The step of processing 282 the first image 132 and the second image 136 with the post image processing system 160 further comprises, using the ellipse fitting process 176 (see FIG. 1) having the threshold parameter 178 (see FIG. 1) to fit the ellipse 180 (see FIGS. 1, 4C, 5A-5B) around selected edge detection points 174*b* (see FIGS. 1, 4C, 5A-5B) of the plurality of edge detection points 174*a* (see FIGS. 1, 4C, 5A-5B) in both the first image 132 (see FIG. 5A) and the second image 136 (see FIG. 5B), to obtain the first image ellipse fitting 182 (see FIGS. 1, 5A) and the second image ellipse fitting 184 (see FIGS. 1, 5B).

The step of processing 282 the first image 132 and the second image 136 with the post image processing system 160 further comprises, using the stereo vision process 186 to triangulate the first image major axis outer points 188 (see FIGS. 5A, 5C) of the first image ellipse fitting 182 (see FIG. 5A) and the second image major axis outer points 192 (see FIGS. 5B, 5C) of the second image ellipse fitting 184 (see FIG. 5B), to obtain the triangulated points 174*c* (see FIGS. 5C-5D), such as the two triangulated points 174*c* (see FIGS. 5C-5D). The step of processing 282 the first image 132 and the second image 136 with the post image processing system 160 further comprises, using the stereo vision process 186 to calculate the distance 194 (see FIGS. 5C-5D) between the two triangulated points 174*c*, to determine the bulb diameter measurement 26*a* (see FIG. 1) of the bulb diameter 15 (see FIGS. 1, 3A-3B) of the fastener bulb 30 of the installed one-sided fastener 16*a*.

As shown in FIG. 7, the method 270 may further comprise the step of comparing 284 the bulb diameter measurement 26*a* (see FIG. 1) to a predetermined bulb diameter measurement 26*b* (see FIG. 1), and accepting the fastener bulb 30 of the installed one-sided fastener 16*a*, if the bulb diameter measurement 26*a* is greater than, or equal to, the predetermined bulb diameter measurement 26*b*, or rejecting the fastener bulb 30 of the installed one-sided fastener 16*a*, if the bulb diameter measurement 26*a* is less than the predetermined bulb diameter measurement 26*b*.

Now referring to FIG. 8, FIG. 8 is an illustration of a perspective view of a vehicle 48, such as an aircraft 50, that may incorporate one or more aircraft structures 52, and aircraft parts 54 (see FIG. 1), having installed one-sided fasteners 16*a* (see FIGS. 1,3A) that may be measured and inspected with the system 10 (see FIG. 1) and the method 270 (see FIG. 7) of the disclosure. As shown in FIG. 8, the aircraft 50 comprises the fuselage 68, wings 70 with engines 71, and the tail 72. The one or more aircraft structures 52 may comprise composite structures, such as carbon fiber reinforced plastic (CFRP) structures or another type of composite structure, may comprise metal structures, such as aluminum, steel, or another type of metal structure, or may comprise a combination of composite and metal structures.

Although the aircraft 50 shown in FIG. 8 is generally representative of a commercial passenger aircraft having one or more aircraft structures 52, the teachings of the disclosed versions may be applied to other passenger aircraft. For example, the teachings of the disclosed versions may be applied to cargo aircraft, military aircraft, rotorcraft, and other types of aircraft or aerial vehicles, as well as aerospace vehicles, spacecraft, satellites, space launch vehicles, rockets, and other aerospace vehicles. Further, the teachings of the disclosed versions may be applied to watercraft, automobiles, trains, architectural structures 66 (see FIG. 1), or other suitable vehicles or structures.

Figure 9:
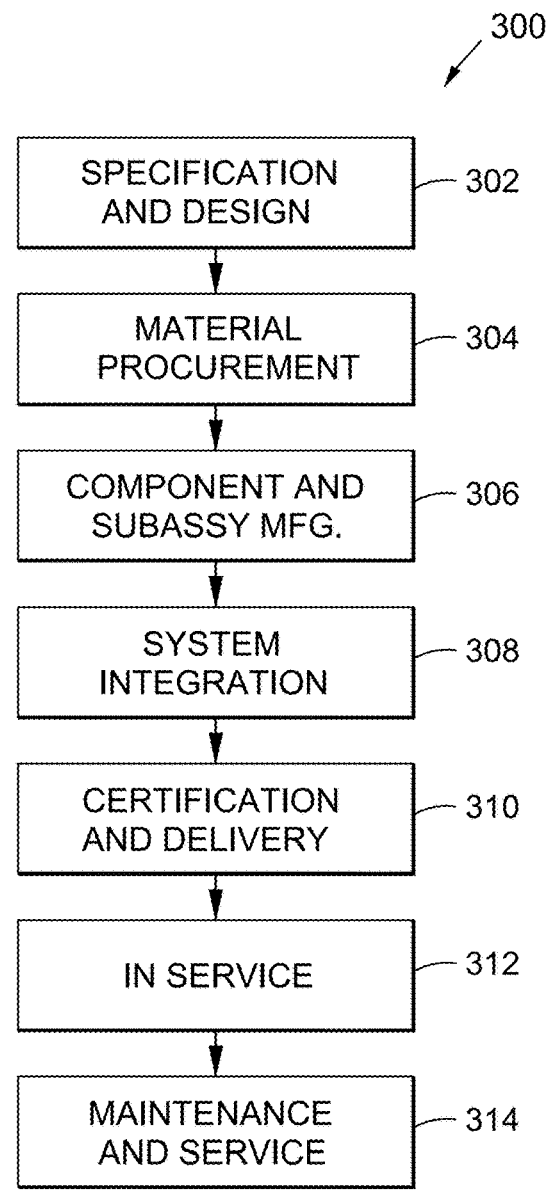
FIG. 9 is an illustration of a flow diagram of an exemplary aircraft manufacturing and service method.
Figure 10:
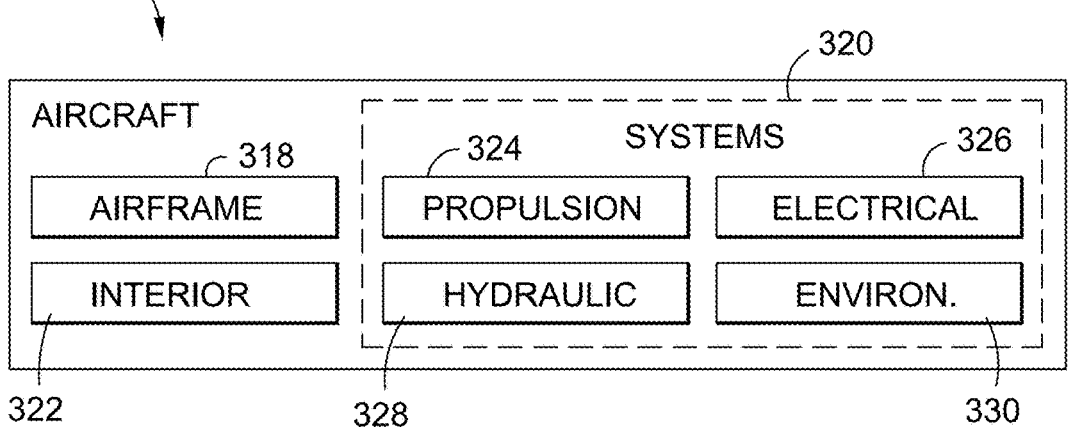
FIG. 10 is an illustration of an exemplary block diagram of an aircraft.

Now referring to FIGS. 9 and 10, FIG. 9 is an illustration of a flow diagram of an exemplary aircraft manufacturing and service method 300, and FIG. 10 is an illustration of an exemplary block diagram of an aircraft 316. Referring to FIGS. 9 and 10, versions of the disclosure may be described in the context of the aircraft manufacturing and service method 300 as shown in FIG. 10, and the aircraft 316 as shown in FIG. 10.

During pre-production, exemplary aircraft manufacturing and service method 300 may include specification and design 302 of the aircraft 316 and material procurement 304. During manufacturing, component and subassembly manufacturing 306 and system integration 308 of the aircraft 316 takes place. Thereafter, the aircraft 316 may go through certification and delivery 310 in order to be placed in service 312. While in service 312 by a customer, the aircraft 316 may be scheduled for routine maintenance and service 314 (which may also include modification, reconfiguration, refurbishment, and other suitable services).

Each of the processes of the aircraft manufacturing and service method 300 may be performed or carried out by a system integrator, a third party, and/or an operator (e.g., a customer).

For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 10, the aircraft 316 produced by the exemplary aircraft manufacturing and service method 300 may include an airframe 318 with a plurality of systems 320 and an interior 322. Examples of the plurality of systems 320 may include one or more of a propulsion system 324, an electrical system 326, a hydraulic system 328, and an environmental system 330. Any number of other systems may be included. Although an aerospace example is shown, the principles of the disclosure may be applied to other industries, such as automotive.

Methods and systems embodied herein may be employed during any one or more of the stages of the aircraft manufacturing and service method 300. For example, components or subassemblies corresponding to component and subassembly manufacturing 306 may be fabricated or manufactured in a manner similar to components or subassemblies produced while the aircraft 316 is in service 312. Also, one or more apparatus embodiments, method embodiments, or a combination thereof, may be utilized during component and subassembly manufacturing 306 and system integration 308, for example, by substantially expediting assembly of or reducing the cost of the aircraft 316. Similarly, one or more of apparatus embodiments, method embodiments, or a combination thereof, may be utilized while the aircraft 316 is in service 312, for example and without limitation, to maintenance and service 314.

Disclosed versions of the system 10 (see FIG. 1), such as the automated system 10a, and the method 270 (see FIG. 7) provide an improved system and method for measuring 12 (see FIG. 1) the bulb diameter 15 (see FIGS. 1, 2B, 3B, 3C) of installed one-sided fasteners 16a (see FIGS. 1, 2B, 3B, 3C) in a structure 18 (see FIG. 1), to allow for no entry confined space inspection of the installed one-sided fastener 16a, resulting in confined space entry work reduction 195 (see FIG. 1). This may, in turn, save time, labor, and costs in inspection and measurement of installed one-sided fasteners 16a installed in a structure 18, as compared to known systems and methods.

The system 10, such as the automated system 10a, and the method 270 use at least the first image 132 (see FIGS. 1, 5A) and the second image 136 (see FIGS. 1, 5B) of the installed one-sided fastener 16a and use the post image processing system 160 (see FIG. 1), to effectively measure the bulb diameter 15 of the fastener bulb 30. The system 10, such as the automated system 10a, and method 270 use at least two precisely taken images 130 (see FIGS. 1, 5A-5B) of the installed one-sided fastener 16a, where the first image 132 is taken at the first position 134 (see FIGS. 1, 3B) and the second image 136 (see FIGS. 1, 3C) is taken at the second position 138 (see FIGS. 1, 3C) which is a predetermined distance 140 (see FIGS. 1, 3C), or known value, from the first position 134. The post image processing system 160 uses the edge detection process 166 (see FIG. 1) to determine points 174 (see FIGS. 1, 5A-5B), such as edge detection points 174a (see FIGS. 1, 5A-5B), between the structure 18, such as the primary structure 18a (see FIG. 1), for example, the aircraft structure 52, and the installed one-sided fastener 16a itself.

The post image processing system 160 uses the ellipse fitting process 176 (see FIG. 1) with the threshold parameter 178 (see FIG. 1), such as a tuned parameter, to determine the selected edge detection points 174b (see FIGS. 1, 4C, 5A-5B), or usable points, to fit the ellipse 180 (see FIGS. 1, 4C, 5A-5B) around the fastener bulb 30. To fit the ellipse 180, selected edge detection points 174b (see FIGS. 4C, 5A-5B) are taken using the edge detection process 166 to find or pinpoint the fastener bulb 30. Fitting of the ellipse 180 around the fastener bulb 30 ensures that the correct bulb diameter 15 (see FIG. 2B) is being measured through the system 10.

The post image processing system 160 uses the stereo vision process 186 (see FIG. 1) to triangulate the image data 128 (see FIG. 1), such as the three-dimensional (3D) data, from the two images 130 (see FIG. 1), such as the first image 132 (see FIGS. 1, 5A) and the second image 136 (see FIGS. 1, 5B), to measure the distance 194 (see FIGS. 1, 5D) between the triangulated points 174c (see FIGS. 1, 5D), such as the two triangulated points 174c, for example, the three-dimensional triangulated points 174d (see FIGS. 5C, 5D), to obtain the bulb diameter measurement 26a (see FIGS. 1, 5D) of the bulb diameter 15 (see FIGS. 1, 3B-3C) of the fastener bulb 30.

In addition, the system 10, such as the automated system 10a, and method 270 may be used to measure not only the bulb diameter 15 but also to measure circular features, such as holes, openings, and the like, formed in the aircraft 50 after drilling.

Disclosed versions of the system 10 (see FIG. 1), such as the automated system 10a, and the method 270 (see FIG. 7) provide an automated inspection during production to eliminate confined space work, and save time for drilling and filling processes to measure and verify installation of installed one-sided fasteners 16a (see FIGS. 1, 2B). The system 10 (see FIG. 1), such as the automated system 10a, and the method 270 (see FIG. 7) for measuring 12 the bulb diameter 15 does not require pixel counting and does not require a known distance or predetermined distance from the installed one-sided fastener 16a to the camera sensor 124 (see FIG. 1), to make the calculation. The system 10 (see FIG. 1), such as the automated system 10a, and the method 270 (see FIG. 7) may be used for installed one-sided fastener 16a that are dry and/or sealed.

In addition, the system 10 (see FIG. 1), such as the automated system 10a, and the method 270 (see FIG. 7) provide a nondestructive inspection system 10b (see FIG. 1) for nondestructive inspection, to take images 130, such as at least a first image 132 and a second image 136 of the fastener bulb 30 (see FIGS. 1, 3B, 3C) of the installed one-sided fasteners 16a (see FIGS. 1, 3B, 3C) against the structure 18. Moreover, disclosed versions of the system 10 (see FIG. 1), such as the automated system 10a, and the method 270 (see FIG. 7) provide potential applications where less destructive examination is required, and can operate even if only one side of the target, such as the installed one-sided fasteners 16a, is available for examination.

Many modifications and other versions of the disclosure will come to mind to one skilled in the art to which this disclosure pertains having the benefit of the teachings presented in the foregoing descriptions and the associated drawings. The versions described herein are meant to be illustrative and are not intended to be limiting or exhaustive. Although specific terms are employed herein, they are used in a generic and descriptive sense only and not for purposes of limitation. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

The invention claimed is:

1. A system for measuring a bulb diameter of an installed one-sided fastener in a structure, the system comprising:
   the structure having a front side and a back side, and a plurality of holes formed through the structure;
   the installed one-sided fastener installed through one of the plurality of holes in proximity to an open hole of the plurality of holes, the installed one-sided fastener having a fastener body protruding from the back side of the structure, and the fastener body having a fastener bulb with the bulb diameter;
   an optical imaging system comprising:
      a probe having a probe tip coupled to a probe rod, the probe tip having a light element and a lens opening;
      a camera sensor; and
      a linear axis slide coupled to the probe rod;
   image data, taken and generated with the optical imaging system, the image data comprising at least a first image of the fastener bulb against the back side of the structure taken from a first position beyond the back side of the structure, and at least a second image of the fastener bulb against the back side of the structure taken from a second position positioned a predetermined distance from the first position; and
   a post image processing system, to process the image data, and to determine a bulb diameter measurement of the bulb diameter of the fastener bulb of the installed one-sided fastener, the post image processing system comprising an edge detection process, an ellipse fitting process, and a stereo vision process.

2. The system of claim 1, wherein the structure comprises one of, a workpiece, a coupon, an aircraft structure, an aircraft part, a spacecraft structure, a rotorcraft structure, a watercraft structure, an automobile structure, a train structure, or an architectural structure.

3. The system of claim 1, wherein the optical imaging system is attached to a movable base of a mobile system.

4. The system of claim 1, wherein the optical imaging system is attached at an end of a robot arm of a robotic system.

5. The system of claim 1, wherein the probe comprises a stack lens endoscope comprising:
   an endoscope probe tip housing a stack lens opening coupled to one or more stack lenses, and housing a light-emitting diode (LED) light element; and
   an endoscope probe rod coupled to, or integral with, the endoscope probe tip.

6. The system of claim 1, wherein the post image processing system further comprises a control system with a computer system comprising:
   one or more computers; and
   one or more computer software programs processed by the one or more computers, the one or more computer software programs executing one or more of the edge detection process, the ellipse fitting process, and the stereo vision process.

7. The system of claim 1, wherein the edge detection process detects for each of the first image and the second image, a color contrast between adjacent pixels of the fastener bulb and the structure, and generates for each of the first image and the second image, at least a plurality of edge detection points at an edge of the fastener bulb between the fastener bulb and the structure.

8. The system of claim 7, wherein the ellipse fitting process uses a threshold parameter to fit an ellipse around selected edge detection points of the plurality of edge detection points in both the first image and the second image, to obtain a first image ellipse fitting and a second image ellipse fitting.

9. The system of claim 8, wherein the stereo vision process triangulates first image major axis outer points of the first image ellipse fitting and second image major axis outer points of the second image ellipse fitting, to obtain two triangulated points, and further wherein the stereo vision process calculates a distance between the two triangulated points, to determine the bulb diameter measurement of the bulb diameter of the installed one-sided fastener.

10. An automated system for measuring a bulb diameter of an installed one-sided fastener in an aircraft structure, the automated system comprising:
   the aircraft structure having a front side and a back side, and a plurality of holes formed through the aircraft structure;
   the installed one-sided fastener installed through one of the plurality of holes in proximity to an open hole of the plurality of holes, the installed one-sided fastener having a fastener body protruding from the back side of the aircraft structure, and the fastener body having a fastener bulb with the bulb diameter;
   an optical imaging system comprising:
      a probe having a probe tip coupled to a probe rod, the probe tip having a light element and a lens opening;
      a camera sensor; and
      a linear axis slide coupled to the probe rod;
   image data, taken and generated with the optical imaging system, the image data comprising at least a first image of the fastener bulb against the back side of the aircraft structure taken from a first position beyond the back side of the aircraft structure, and at least a second image of the fastener bulb against the back side of the aircraft structure taken from a second position positioned a predetermined distance from the first position; and
   a post image processing system, to process the image data, and to determine a bulb diameter measurement of the bulb diameter of the installed one-sided fastener, the post image processing system comprising:
      a control system comprising a computer system comprising:
         one or more computers; and
         one or more computer software programs processed by the one or more computers, the one or more computer software programs executing one or more of, an edge detection process, an ellipse fitting process, and a stereo vision process.

11. The automated system of claim 10, wherein the optical imaging system is attached to a movable base of a mobile system.

12. The automated system of claim 10, wherein the optical imaging system is attached at an end of a robot arm of a robotic system.

13. The automated system of claim 10, wherein the edge detection process detects for each of the first image and the second image, a color contrast between a fastener bulb color and a structure color of the aircraft structure, and generates for each of the first image and the second image, at least a plurality of edge detection points at an edge of the fastener bulb between the fastener bulb and the aircraft structure.

14. The automated system of claim 13, wherein:
   the ellipse fitting process uses a threshold parameter to fit an ellipse around selected edge detection points of the plurality of edge detection points in both the first image and the second image, to obtain a first image ellipse fitting and a second image ellipse fitting; and wherein the stereo vision process triangulates first image major axis outer points of the first image ellipse fitting and second image major axis outer points of the second image ellipse fitting, to obtain two triangulated points, and further wherein the stereo vision process calculates a distance between the two triangulated points, to determine the bulb diameter measurement of the bulb diameter of the installed one-sided fastener.

15. A method for measuring a bulb diameter of an installed one-sided fastener installed in a structure, the method comprising the steps of:
positioning an optical imaging system at a front side of the structure directed at an open hole in the structure, the open hole in proximity to the installed one-sided fastener installed in the structure, and the optical imaging system comprising:
  a probe having a probe tip coupled to a probe rod, the probe tip having a light element and a lens opening;
  a camera sensor; and
  a linear axis slide coupled to the probe rod;
inserting the probe tip through the open hole to a first position beyond a back side of the structure, so that the lens opening is directed at the installed one-sided fastener, the installed one-sided fastener having a fastener body protruding from the back side of the structure, and the fastener body having a fastener bulb with the bulb diameter;
taking and generating, with the optical imaging system, from the first position, a first image of at least the fastener bulb against the back side of the structure;
moving the probe tip a predetermined distance from the first position to a second position beyond the back side of the structure, so that the lens opening is directed at the installed one-sided fastener;
taking and generating, with the optical imaging system, from the second position, a second image of at least the fastener bulb against the back side of the structure; and
processing the first image and the second image with a post image processing system, to determine a bulb diameter measurement of the bulb diameter of the fastener bulb of the installed one-sided fastener, the post image processing system comprising an edge detection process, an ellipse fitting process, and a stereo vision process.

16. The method of claim 15, wherein the method further comprises the step of comparing the bulb diameter measurement to a predetermined bulb diameter measurement, and accepting the fastener bulb of the installed one-sided fastener, if the bulb diameter measurement is greater than, or equal to, the predetermined bulb diameter measurement, or rejecting the fastener bulb of the installed one-sided fastener, if the bulb diameter measurement is less than the predetermined bulb diameter measurement.

17. The method of claim 15, wherein the step of positioning the optical imaging system further comprises, positioning the optical imaging system attached to one of, a movable base of a mobile system, or an end of a robot arm of a robotic system.

18. The method of claim 15, wherein processing the first image and the second image with the post image processing system further comprises, using the edge detection process to detect a color contrast between adjacent pixels of the fastener bulb and the structure, and generating for each of the first image and the second image, at least a plurality of edge detection points at an edge of the fastener bulb between the fastener bulb and the structure.

19. The method of claim 18, wherein processing the first image and the second image with the post image processing system further comprises, using the ellipse fitting process having a threshold parameter to fit an ellipse around selected edge detection points of the plurality of edge detection points in both the first image and the second image, to obtain a first image ellipse fitting and a second image ellipse fitting.

20. The method of claim 19, wherein processing the first image and the second image with the post image processing system further comprises, using the stereo vision process:
  to triangulate first image major axis outer points of the first image ellipse fitting and second image major axis outer points of the second image ellipse fitting, to obtain two triangulated points; and
  to calculate a distance between the two triangulated points, to determine the bulb diameter measurement of the bulb diameter of the installed one-sided fastener.

* * * * *